United States Patent
Tabata et al.

(10) Patent No.: US 11,192,424 B2
(45) Date of Patent: Dec. 7, 2021

(54) STABILIZER DEVICE AND STABILIZER SYSTEM

(71) Applicant: Toyota Jidosha Kabushiki Kaisha, Toyota (JP)

(72) Inventors: Masaaki Tabata, Nagoya (JP); Ryo Masutani, Toyota (JP); Kazuyuki Murata, Toyota (JP); Masashi Yamamoto, Chiryu (JP); Hideki Nakayama, Nissin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 64 days.

(21) Appl. No.: 16/707,447

(22) Filed: Dec. 9, 2019

(65) Prior Publication Data

US 2020/0180386 A1 Jun. 11, 2020

(30) Foreign Application Priority Data

Dec. 11, 2018 (JP) .............................. JP2018-231837

(51) Int. Cl.
*B60G 21/055* (2006.01)
*B60G 17/016* (2006.01)
(Continued)

(52) U.S. Cl.
CPC ..... *B60G 21/0558* (2013.01); *B60G 17/0162* (2013.01); *B60G 17/0165* (2013.01);
(Continued)

(58) Field of Classification Search
CPC .............. B60G 21/0558; B60G 21/055; B60G 17/0162; B60G 17/0165; B60G 21/073; B60G 2204/1222
See application file for complete search history.

(56) References Cited

U.S. PATENT DOCUMENTS 3,396,984 A * 8/1968 Cadiou ..................... C23C 2/02
280/5.509
3,885,775 A * 5/1975 Bolduc ............... B60G 21/055
267/188
(Continued)

FOREIGN PATENT DOCUMENTS

FR 2930197 A3 * 10/2009 ......... B60G 17/0162
JP 2001/021423 A 1/2001
(Continued)

OTHER PUBLICATIONS

Machine Translation of FR-2930197 (Year: 2009).*

*Primary Examiner* — James A English
*Assistant Examiner* — Kurtis Nielson
(74) *Attorney, Agent, or Firm* — Dinsmore & Shohl LLP

(57) ABSTRACT

In a stabilizer device, a stabilizer bar having both ends connected to right and left wheel holding portions is supported at a pair of right and left supported portions of the stabilizer bar by a vehicle body via a pair of cylinders that can be extended and retracted based on vertical movement of wheels. The stabilizer device includes two communication passages, each of which allows one of two liquid chambers of one of the pair of cylinders and the other of two liquid chambers of the other cylinder to communicate with each other. The stabilizer device further includes an inter-passage communication passage that allows the two communication passages to communicate with each other, and an on-off valve that is opened and closed to open and close the inter-passage communication passage.

21 Claims, 7 Drawing Sheets

(51) Int. Cl.
  *B60G 21/073* (2006.01)
  *B60G 17/0165* (2006.01)

(52) U.S. Cl.
  CPC ......... *B60G 21/055* (2013.01); *B60G 21/073* (2013.01); *B60G 2202/1351* (2013.01); *B60G 2204/41* (2013.01); *B60G 2600/26* (2013.01); *B60G 2800/012* (2013.01)

(56) References Cited

U.S. PATENT DOCUMENTS

| | | | | |
|---|---|---|---|---|
| 5,106,120 | A * | 4/1992 | Di Maria | B60G 17/0152 137/45 |
| 5,149,131 | A * | 9/1992 | Sugasawa | B60G 17/0162 280/5.512 |
| 5,362,094 | A * | 11/1994 | Jensen | B60G 21/0555 280/124.107 |
| 5,630,623 | A * | 5/1997 | Ganzel | B60G 21/055 280/124.106 |
| 5,794,966 | A * | 8/1998 | MacLeod | B60G 21/067 280/124.104 |
| 6,206,383 | B1 * | 3/2001 | Burdock | B60G 17/0152 280/5.506 |
| 7,234,707 | B2 * | 6/2007 | Green | B60G 17/0162 137/884 |
| 7,600,770 | B2 * | 10/2009 | Walentowski | B60G 11/27 280/124.13 |
| 7,789,398 | B2 * | 9/2010 | Munday | B60G 21/06 280/5.507 |
| 2004/0173985 | A1 * | 9/2004 | Bruhl | B60G 21/0551 280/124.106 |
| 2005/0077696 | A1 * | 4/2005 | Ogawa | B60G 17/0162 280/124.157 |
| 2006/0287791 | A1 * | 12/2006 | Boon | B60G 17/0152 701/38 |
| 2008/0269987 | A1 * | 10/2008 | Barron | B60G 17/0162 701/38 |
| 2009/0020966 | A1 * | 1/2009 | Germain | B60G 21/0555 280/5.508 |
| 2014/0232082 | A1 * | 8/2014 | Oshita | B60G 17/08 280/124.161 |
| 2016/0200164 | A1 | 7/2016 | Tabata et al. | |
| 2017/0174036 | A1 * | 6/2017 | Kuroda | B60G 21/026 |

FOREIGN PATENT DOCUMENTS

| | | |
|---|---|---|
| JP | 4012576 B2 | 11/2007 |
| JP | 4036393 B2 | 1/2008 |
| JP | 2009-023650 A | 2/2009 |
| JP | 4782339 B2 | 9/2011 |
| JP | 6194902 B2 | 9/2017 |
| WO | 98/028160 A1 | 7/1998 |
| WO | 98/036923 A1 | 8/1998 |

* cited by examiner

STABILIZER DEVICE AND STABILIZER SYSTEM

CROSS-REFERENCE TO RELATED APPLICATIONS

This application claims priority to Japanese Patent Application No. 2018-231837 filed on Dec. 11, 2018, which is incorporated herein by reference in its entirety including the specification, drawings and abstract.

BACKGROUND

1. Technical Field

The disclosure relates to a stabilizer device and a stabilizer system.

2. Description of Related Art

Stabilizer devices are mounted on vehicles in order to reduce roll of vehicle bodies and include a stabilizer bar as a main component. In recent years, stabilizer devices and stabilizer systems have been increasingly developed. For example, as described in Japanese Unexamined Patent Application Publication No. 2009-23650 (JP 2009-23650 A), an anti-roll force generated by a stabilizer bar is controlled by a hydraulic cylinder to more appropriately control roll of a vehicle body.

SUMMARY

The stabilizer device as described in JP 2009-23650 A, that is, a stabilizer device using a hydraulic cylinder, has much room for improvement. By making improvements, the stabilizer device would become more practical. The disclosure provides a highly practical stabilizer device and a highly practical stabilizer system including such a stabilizer device.

A first aspect of the present disclosure provides a stabilizer device. The stabilizer device according to the first aspect includes: a stabilizer bar having both ends connected to a pair of wheel holding portions each of which holds a corresponding one of right and left wheels and moves with the corresponding wheel in a vertical direction relative to a vehicle body; a pair of cylinders each containing hydraulic fluid and disposed between the vehicle body and a corresponding one of a pair of right and left supported portions of the stabilizer bar such that the pair of supported portions are supported by the vehicle body, each of the cylinders being configured to be extended and retracted as a corresponding one of the right and left wheels rebounds and bounds with respect to the vehicle body, and each of the cylinders including a first liquid chamber having a capacity that increases when a corresponding one of the right and left wheels rebounds and that decreases when the corresponding wheel bounds and a second liquid chamber having a capacity that decreases when the corresponding wheel rebounds and that increases when the corresponding wheel bounds; a first communication passage that allows first liquid chamber of a first cylinder of the pair of cylinders and second liquid chamber of a second cylinder of the pair of cylinders to communicate with each other; a second communication passage that allows second liquid chamber of the first cylinder and first liquid chamber of the second cylinder to communicate with each other; an inter-passage communication passage that allows the first communication passage and the second communication passage to communicate with each other; an on-off valve disposed in the inter-passage communication passage and switched between an open state and a closed state to open and close the inter-passage communication passage; and a controller configured to control operation of the on-off valve to selectively attain an inter-passage communicating state in which the first communication passage and the second communication passage communicate with each other and an inter-passage non-communicating state in which the first communication passage and the second communication passage do not communicate with each other.

The first communication passage and the second communication passage in the stabilizer device of the above configuration can be, e.g., cross pipes. The stabilizer device of the above configuration can be considered to have two hydraulic systems each comprised of one of the first and second communication passages and two of the liquid chambers of the cylinders which are connected by the one of the first and second communication passages. In the stabilizer device of the above configuration, the inter-passage communicating state and the inter-passage non-communicating state are selectively attained by controlling operation of the on-off valve disposed in the inter-passage communication passage.

When the inter-passage non-communicating state is attained, the two hydraulic systems become independent. Accordingly, extension and retraction of each of the pair of cylinders is limited, and each of the pair of supported portions of the stabilizer bar is not allowed to move, specifically, is not allowed to move with respect to the vehicle body. Accordingly, when the vehicle body rolls, the stabilizer bar is twisted as in common stabilizer devices, and the reaction force to the twisting force acts between the vehicle body and the right and left wheels as an anti-roll force. The roll of the vehicle body is thus effectively reduced.

When the inter-passage communicating state is attained, hydraulic fluid is allowed to relatively freely flow into and out of each of the two liquid chambers of each cylinder, namely each of the four liquid chambers of the pair of cylinders. Accordingly, the pair of supported portions of the stabilizer bar are allowed to relatively freely move based on vertical movement of each of the right and left wheels. As a result generation of the anti-roll force is limited, and the stabilizer device can effectively absorb road inputs to the right and left wheels during off-road driving, namely when the vehicle moves on an uneven road surface (ground surface), a rough road, etc. In other words, the road input to one of the right and left wheels is restrained from causing relative movement between the other wheel and the vehicle body. Satisfactory riding comfort etc. is maintained during off-road driving.

Both of the first and second communication passages of the above configuration extend over a relatively long distance in a lateral direction of the vehicle, the inter-passage communication passage can be made relatively short by connecting the inter-passage communication passage to those parts of the first and second communication passages which are located close to each other.

In the first aspect, each of the pair of cylinders may include a housing connected to one of the vehicle body and a corresponding one of the pair of supported portions of the stabilizer bar, a piston disposed in the housing and defining the first liquid chamber and the second liquid chamber, and a piston rod having a base end connected to the piston, the piston rod extending through one of the first liquid chamber and the second liquid chamber such that a tip end of the piston rod extends out of the housing, and the piston rod being connected to the other of the vehicle body and the corresponding one of the pair of supported portions of the stabilizer bar.

The cylinders of the above configuration are common cylinders, that is, cylinders with a piston rod extending out of a housing only from one side of the housing (hereinafter, sometimes referred to as "one-side rod cylinder") and are simple in structure and inexpensive. Cylinders with a piston rod extending out of a housing from both sides of the housing (hereinafter sometimes referred to as "both-side rod cylinder"), that is, cylinders with a piston rod extending through both first and second liquid chambers, may be used instead of the cylinders of the above configuration. Such cylinders are more expensive than one-side rod cylinders due to complexity of their structure. However, with such cylinders, the pressure receiving area of the piston receiving the pressure of hydraulic fluid in the first liquid chamber is equal to that of the piston receiving the pressure of hydraulic fluid in the second liquid chamber.

In the first aspect, the stabilizer device may include a holder with which the stabilizer bar is held at a held portion by the vehicle body while allowing the stabilizer bar to rotate as one of the right and left wheels bounds and the other wheel rebounds, the held portion being located in a middle part of the stabilizer bar in a vehicle-width direction of a vehicle.

According to the above configuration, when the stabilizer device is in the inter-passage communicating state, (or example, the stabilizer bar is allowed to rotate such that the pair of supported portions move by the same distance in opposite directions in the vertical direction. Especially when one-side rod cylinders are used as the cylinders, the pressure receiving area of the piston receiving the pressure of hydraulic fluid in the first liquid chamber is different from that of the piston receiving the pressure of hydraulic fluid in the second liquid chamber. In this case, when the stabilizer device is in the inter-passage communicating state, both of the pair of supported portions move in the same direction in the vertical direction. According to the above configuration, the pair of supported portions are restrained from moving in the same direction in the vertical direction.

In the first aspect, the holder may include a bush for the held portion and allow the stabilizer bar to rotate using elasticity of the bush for the held portion.

For example, a member such as a ball joint can be used to allow the stabilizer bar to rotate. However, according to the above configuration, a simple structure, namely compliance of an elastic body, is used to allow the stabilizer bar to rotate.

In the first aspect, a pair of elastic bushes for the supported portions may be provided such that each of the pair of elastic bushes is interposed between a corresponding one of the pair of cylinders and a corresponding one of the pair of supported portions of the stabilizer bar, and the bush for the held portion may have a smaller spring constant in the vertical direction than each of the bushes for the supported portions.

In the above configuration, like common stabilizer devices, the pair of supported portions are also supported via bushes. In other words, the above configuration can be considered to be a configuration in which the pair of bushes for the supported portions are hard and the bush for the held portion is soft. According to the above configuration, a sufficient anti-roll force is generated when the stabilizer device is in the inter-passage non-communicating state, and the stabilizer bar is easily rotated when the stabilizer device is in the inter-passage communicating state.

In the first aspect, the controller may be configured to attain the inter-passage communicating state in a situation where a vehicle equipped with the stabilizer device is driving off-road or a situation where the vehicle equipped with the stabilizer device is going to drive off-road.

According to the above configuration, the stabilizer bar does not generate an anti-roll force and the stabilizer device effectively absorbs road inputs during off-road driving. Relatively satisfactory riding comfort is therefore achieved during off-road driving.

In the first aspect, a necessary condition for the controller to attain the inter-passage non-communicating state may be that the vehicle equipped with the stabilizer device is turning.

According to the above configuration, roll of the vehicle body which is caused when the vehicle turns is effectively reduced.

In the first aspect, the on-off valve may be a normally closed electromagnetic valve that is opened when energized.

According to the above configuration, in the event that the stabilizer device has, e.g., an electrical failure, the inter-passage non-communicating state is maintained, and the stabilizer device reliably has an anti-roll effect.

In the first aspect, the stabilizer device may include a flow rate limiting mechanism limiting a flow rate of hydraulic fluid that is allowed to flow between the first communication passage and the second communication passage when the stabilizer device is switched from the inter-passage non-communicating stale to the inter-passage communicating state.

When the stabilizer device is in the inter-passage non-communicating state, the difference in pressure of hydraulic fluid between the two hydraulic systems can be somewhat large. When the stabilizer device having a large pressure difference between the two hydraulic systems is switched from the inter-passage non-communicating state to the inter-passage communicating state, hydraulic fluid rushes from the hydraulic system with a higher pressure into the hydraulic system with a lower pressure. This sudden and quick flow of hydraulic fluid has an impact (shock) on the stabilizer device to some extent, which may cause abnormal noise, vibrations, etc. The above configuration is made in view of such circumstances, and according to the above configuration, the flow rate limiting mechanism restrains hydraulic fluid from rushing from one hydraulic system to the other when the stabilizer device is switched from the inter-passage non-communicating state to the inter-passage communicating state. Specifically, for example, the flow rate limiting mechanism is made to work for the estimated time it takes until there is almost no pressure difference between the two hydraulic systems from the time the stabilizer device is switched from the inter-passage non-communicating state to the inter-passage communicating state.

In the first aspect, when the inter-passage communication passage is a first inter-passage communication passage, and the on-off valve is a first on-off valve, the stabilizer device may include, as components of the flow rate limiting mechanism, a second inter-passage communication passage that allows the first communication passage and the second communication passage to communicate with each other, in addition to the first inter-passage communication passage, a second on-off valve that is disposed in the second inter-passage communication passage and is switched between an open state and a closed state to open and close the second inter-passage communication passage, and an orifice that is disposed in series with the second on-off valve in the second inter-passage communication passage and restricts flow of hydraulic fluid passing through the second inter-passage communication passage, and the controller may be configured to control operation of the second on-off valve and to first switch the second on-off valve from the closed state to the open state, and then, after a set time, switch the first on-off valve from the closed state to the open state when switching the stabilizer device from the inter-passage non-communicating state to the inter-passage communicating state so as to allow the flow rate limiting mechanism to function.

In the first aspect, when the on-off valve is a first on-off valve, the stabilizer device may include, as the flow rate limiting mechanism, a second on-off valve disposed in series with the first on-off valve in the inter-passage communication passage such that the second on-off valve is located between the first on-off valve and one of the first communication passage and the second communication passage, a branch passage connecting to the inter-passage communication passage at a position between the first on-off valve and the second on-off valve and connecting the inter-passage communication passage and the other of the first communication passage and the second communication passage, and an orifice that is disposed in the branch passage and restricts flow of hydraulic fluid passing through the branch passage; and the controller may be configured to control operation of the second on-off valve and to first switch the second on-off valve from a closed state to an open state, and then, after a set time, switch the first on-off valve from the closed state to the open state when switching the stabilizer device from the inter-passage non-communicating state to the inter-passage communicating state so as to allow the flow rate limiting mechanism to function.

The flow rate limiting mechanism of the above configurations have a relatively simple structure.

In the first aspect, the first on-off valve may be a normally closed electromagnetic valve that is opened when energized, and the second on-off valve is a normally open electromagnetic valve that may be closed when energized.

According to the above configuration, in the event that the stabilizer device has, e.g., an electrical failure, the inter-passage communicating state is maintained through the orifice, and the stabilizer device has a certain anti-roll effect due to the flow rate limitation by the orifice.

A second aspect of the disclosure provides a stabilizer system. The stabilizer system according to the second aspect includes: the stabilizer device according to the first aspect provided for either right and left front wheels or right and left rear wheels, the stabilizer device being a first stabilizer device; and a second stabilizer device different from the first stabilizer device and provided for the other of the right and left front wheels and the right and left rear wheels.

In the second aspect, the second stabilizer device may include: a stabilizer bar having both ends connected to one of a vehicle body and a pair of wheel holding portions each of which holds a corresponding one of right and left wheels and moves with the corresponding wheel in a vertical direction relative to the vehicle body, and the stabilizer bar being supported by the other of the vehicle body and the pair of wheel holding portions: a cylinder disposed between the one of the vehicle body and the pair of wheel holding portions and one of the both ends of the stabilizer bar and configured to be extended and retracted as one of the right and left wheels rebounds and the other wheel bounds and as the one of the right and left wheels bounds and the other wheel rebounds, the cylinder including a first liquid chamber having a capacity that increases when the cylinder is extended and that decreases when the cylinder is retracted and a second liquid chamber having a capacity that decreases when the cylinder is extended and that increases when the cylinder is retracted: an inter-chamber communication passage that allows the first liquid chamber and the second liquid chamber to communicate with each other, and one or more on-off valves that are disposed in the inter-chamber communication passage and are switched between an open state and a closed state to open and close the inter-chamber communication passage, wherein the controller may be configured to control operation of the one or more on-off valves to selectively attain an inter-chamber communicating state in which the first liquid chamber and the second liquid chamber communicate with each other and an inter-chamber non-communicating state in which the first liquid chamber and the second liquid chamber do not communicate with each other.

In the second stabilizer device of the above configuration, extension and retraction of the cylinder is limited by attaining the inter-chamber communicating state. When the vehicle body rolls, the stabilizer bar is twisted as in common stabilizer devices, and the reaction force to the twisting force acts between the vehicle body and the right and left wheels as an anti-roll force. The roll of the vehicle body is thus effectively reduced. The cylinder is allowed to be relatively freely extended and retracted by attaining the inter-chamber communicating state. The stabilizer device can thus effectively absorb road inputs to the right and left wheels during, e.g., off-road driving. The first stabilizer device uses a pair of cylinders to control whether to exert an anti-roll effect, while the second stabilizer uses only a single cylinder to control whether to exert an anti-roll effect. In this respect, the second stabilizer device is a device with a simple structure.

In the second aspect, the stabilizer system may be configured such that roll stiffness on a front wheel side becomes higher than roll stiffness on a rear wheel side when the inter-passage non-communicating state is attained in the first stabilizer device and the inter-chamber non-communicating state is attained in the second stabilizer device.

In the above configuration, when the first stabilizer device and the second stabilizer device are exerting the anti-roll effect, roll stiffness distribution is such that the roll stiffness on the front wheel side is higher. When the roll stiffness increases, the difference in vertical load between the right and left wheels increases, and a generated lateral force or cornering force therefore decreases. Accordingly, the vehicle equipped with the stabilizer system of the above configuration tends to understeer. For example, by attaining the inter-passage non-communicating state in the first stabilizer device and attaining the inter-chamber non-communicating state in the second stabilizer device in the event of an electrical failure, the vehicle exhibits a relatively stable turning behavior even in case of a failure. In the above configuration in which the stabilizer device has the orifice, it is desirable in terms of the turning behavior that roll rigidity on the front wheel side become higher than that on the rear wheel side even when the inter-passage communication passage is attained in the first stabilizer device through the orifice. In the above configuration and other configurations as well, the vehicle having a relatively strong tendency to understeer when turning in the event of an electrical failure can be implemented by causing one of the first and second stabilizer devices which is provided for the front wheels to exert the anti-roll effect and causing the other stabilizer device that is provided for the rear wheels not to exert the anti-roll effect in the event of an electrical failure.

In the second aspect, the cylinder of the second stabilizer device may include a housing connected to either the one of the vehicle body and the pair of wheel holding portions or the one of the both ends of the stabilizer bar, a piston disposed in the housing and defining the first liquid chamber and the second liquid chamber, and a piston rod having a base end connected to the piston, the piston rod extending through one of the first liquid chamber and the second liquid chamber such that a tip end of the piston rod extends out of the housing, and the piston rod being connected to the other of the one of the vehicle body and the pair of wheel holding portions and the one of the both ends of the stabilizer bar. The second stabilizer device may include a first on-off valve and a second on-off valve which are the one or more on-off valves and are arranged in series in the inter-chamber communication passage, and an accumulator that is connected to the inter-chamber communication passage at a position between the first on-off valve and the second on-off valve and that stores hydraulic fluid. The controller may be configured to attain the inter-chamber communicating state by opening both the first on-off valve and the second on-off valve and to attain the inter-chamber non-communicating state by closing both the first on-off valve and the second on-off valve.

According to the above configuration, the cylinder can be simple in structure and inexpensive. In the one-side rod cylinder, there is a difference between the amount of hydraulic fluid flowing into and out of the first liquid chamber as the cylinder is extended and extracted and the amount of hydraulic fluid flowing into and out of the second liquid chamber as the cylinder is extended and retracted. The second stabilizer device therefore further includes the accumulator.

In the second aspect, at least one of the first communication passage and the second communication passage of the first stabilizer device may be connected to the accumulator of the second stabilizer device via a valve mechanism.

In the first stabilizer device of the above configuration, hydraulic fluid is allowed to flow into and out of the two hydraulic systems through the valve mechanism. The purpose of this configuration is not particularly limited. However, for example, the first stabilizer device may be configured so that hydraulic fluid can flow into and out of the two hydraulic systems in order to respond to a volume change of hydraulic fluid described later, to restrain cavitation that occurs in the liquid chambers of the cylinder, etc. An accumulator is required in the case where such a configuration is used. This configuration can be considered to be a configuration in which the accumulator of the second stabilizer device described in the above configuration plays the role of this accumulator. Therefore, according to the above configuration, the number of accumulators to be disposed can be reduced. From another perspective, the above configuration can also be considered to be a configuration in which the hydraulic systems of the first stabilizer device and the hydraulic system of the second stabilizer device are coupled to each other.

In the second aspect, the valve mechanism may be a mechanism that allows hydraulic fluid to flow into and out of the at least one of the first communication passage and the second communication passage in accordance with a volume change of hydraulic fluid which is caused by a temperature change of the first stabilizer device.

According to the above configuration, even when the temperature of an environment where the vehicle is placed changes, proper operation of the first stabilizer device is ensured.

In the second aspect, the stabilizer system may include a single injection port that is used by both the first stabilizer device and the second stabilizer device such that hydraulic fluid is injected into both the accumulator and the valve mechanism.

According to the above configuration, a stabilizer system with a rational configuration can be constructed, and hydraulic fluid can be injected into the stabilizer system in a simple and easy manner.

In the second aspect, the first stabilizer device may be provided for the right and left front wheels, and the second stabilizer device may be provided for the right and left rear wheels that are suspended by a rigid axle suspension system.

In the second aspect, the second stabilizer device may be configured such that the stabilizer bar is supported by an axle housing, both ends of the axle housing serving as the pair of wheel holding portions, and the both ends of the stabilizer bar may be connected to right and left parts of the vehicle body.

The rigid axle suspension system is suitable for vehicles for off-road driving due to its robust structure, and the stabilizer system that can control whether to exert the anti-roll effect is also suitable for vehicles for off-road driving, specifically, vehicles that can drive both off-road and on-road (on relatively good road surfaces). Therefore, according to the above configuration, a high-performance vehicle that can drive off-road can be constructed.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A stabilizer device according to an embodiment of the disclosure and a stabilizer system according to an embodiment, which includes the stabilizer device, will be described as modes for carrying out the disclosure, and modifications of the stabilizer device of the embodiment will be described in detail with reference to the accompanying drawings. In addition to the following embodiment, the disclosure can be carried out in various forms including the forms described in the above section "SUMMARY" and various modified or improved forms that are made based on the knowledge of those skilled in the art.

[1] Configuration of Stabilizer System

Figure 1:
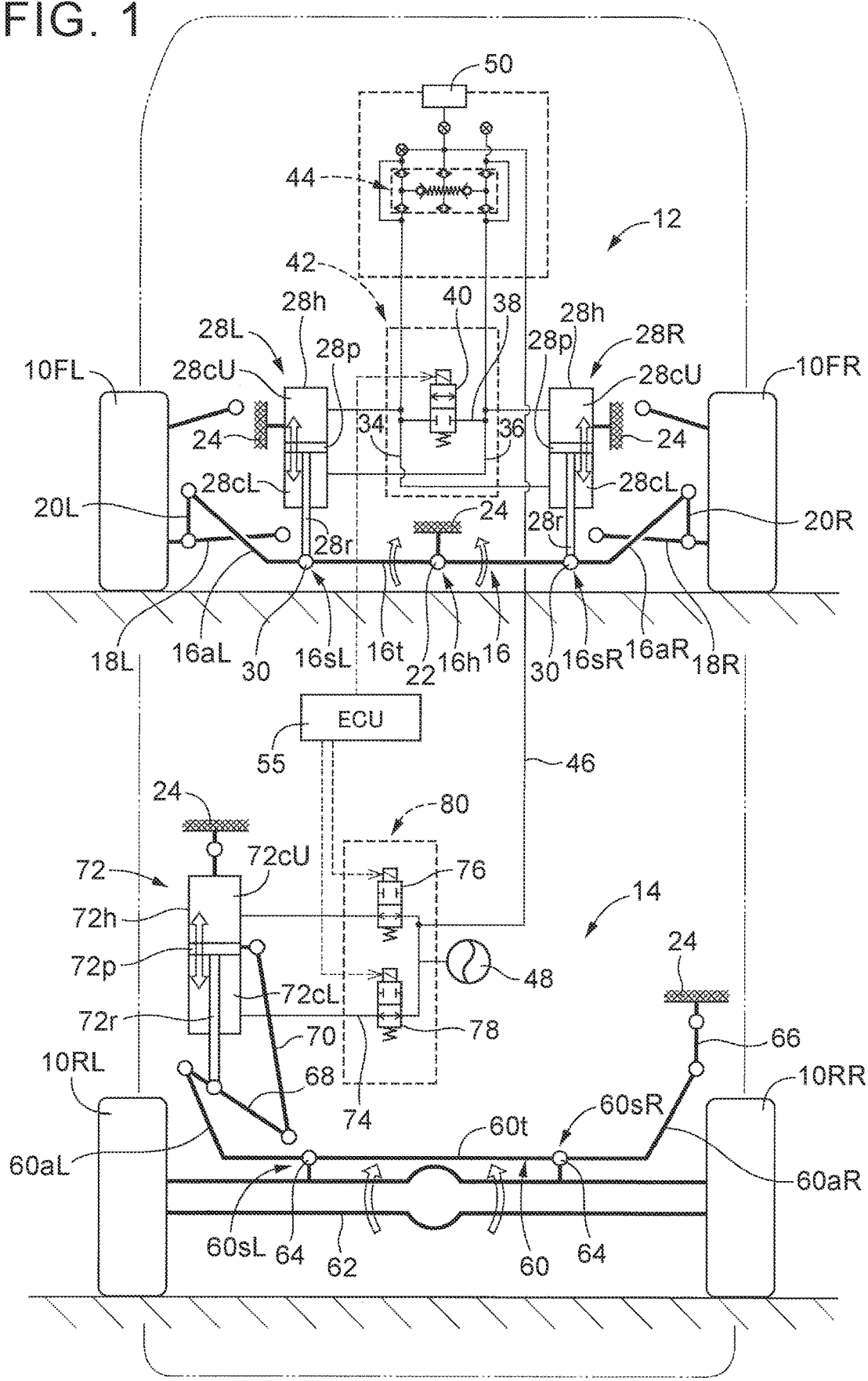
FIG. 1 is a schematic diagram of a stabilizer system of an embodiment having a stabilizer device of an embodiment, which is a first stabilizer device, mounted for front wheels.

As schematically shown in FIG. 1, a stabilizer system of an embodiment includes a first stabilizer device 12 mounted on right and left front wheels 10FL, 10FR of a vehicle and a second stabilizer device 14 mounted on right and left rear wheels 10RR, 10RL of the vehicle. The first stabilizer device 12 is a stabilizer device of an embodiment. When one of the right and left front wheels 10FR, 10FL is mentioned, this front wheel is sometimes simply referred to as the "front wheel 10F." Similarly, when one of the right and left rear wheels 10RR, 10RL is mentioned, this rear wheel is sometimes simply referred to as the "rear wheel 10L." When one of the right and left front wheels 10FR, 10FL and the right and left rear wheels 10RR, 10RL is mentioned, this wheel is sometimes simply referred to as the "wheel 10" when it is not necessary to distinguish between right and left.

(a) Configuration of First Stabilizer Device

Each of the front wheels 10FR, 10FL is suspended by a double wishbone suspension system that is an independent suspension system. The first stabilizer device 12 includes a stabilizer bar 16 as a main component. The stabilizer bar 16 includes a middle torsion bar portion 16$t$ and right and left arm portions 16$a$R, 16$a$L. The torsion bar portion 16$t$ and the right and left arm portions 16$a$R, 16$a$L form a single-piece member. The directions in which the right and left arm portions 16$a$R, 16$a$L extend cross the lateral direction of the vehicle, namely the direction in which the torsion bar portion 16$t$ extends. Both ends of the stabilizer bar 16, that is, the tip ends of the right and left arm portions 16$a$R, 16$a$L, are connected to right and left lower arms 18R, 18L via link rods 20R, 20L, respectively.

The lower arms 18R, 18L function as a pair of wheel holding portions each of which holds a corresponding one of the right and left front wheels 10FR, 10FL and moves with the corresponding wheel 10F in the vertical direction with respect to a vehicle body. Although not shown in the figure, two sets of suspension spring and shock absorber have their one ends supported by mount portions of the vehicle body, and the other ends of the sets of suspension spring and shock absorber are connected to the lower arms 18R, 18L. Regarding each pair of right and left components whose reference characters end with L or R, such as the arm portions 16$a$R, 16$a$L and the lower arms 18R, 18L, when one of the right and left components is mentioned, this component is sometimes simply referred to as the "arm portion 16$a$," the "lower arm 18," etc. when it is not necessary to distinguish between right and left.

As will be described in detail later, the stabilizer bar 16 has a held portion 16$h$ in the middle of the torsion bar portion 16$t$ in the lateral direction of the vehicle. The stabilizer bar 16 is held at the held portion 16$h$ by a part 24 of the vehicle body (each part 24 of the vehicle body is shown hatched in the figure) via a holder 22. As shown in FIG. 2A, the holder 22 includes a bush 26 for the held portion 16$h$. The bush 26 for the held portion 16$h$ includes an outer cylinder 26$o$ and a rubber elastic body 26$g$ interposed between the outer cylinder 26$o$ and the torsion bar portion 16$t$ of the stabilizer bar 16, and the stabilizer bar 16 is allowed to rotate about the held portion 16$h$ (as shown by white arrows in FIG. 1). The bush 26 for the held portion 16$h$ allows the stabilizer bar 16 to rotate, i.e., twist, about the axis of the torsion bar portion 16$t$.

The first stabilizer device 12 includes a pair of cylinders 28R, 28L. Each of the cylinders 28R, 28L includes a housing 28$h$, a piston 28$p$ disposed in the housing 28$h$, a piston rod 28$r$. The piston rod 28$r$ has its base end connected to the piston 28$p$ and extends down ward so that its tip end (lower end) extends out of the housing 28$h$. The housings 28$h$ of the pair of cylinders 28R, 28L are fixedly connected to parts 24 of the vehicle body, and the tip end of the piston rod 28$r$ of each cylinder 28R, 28L is connected to a corresponding one of a pair of right and left supported portions 16$s$R, 16$s$L of the torsion bar portion 16$t$ of the stabilizer bar 16 via a corresponding one of supports 30.

Figure 2B:
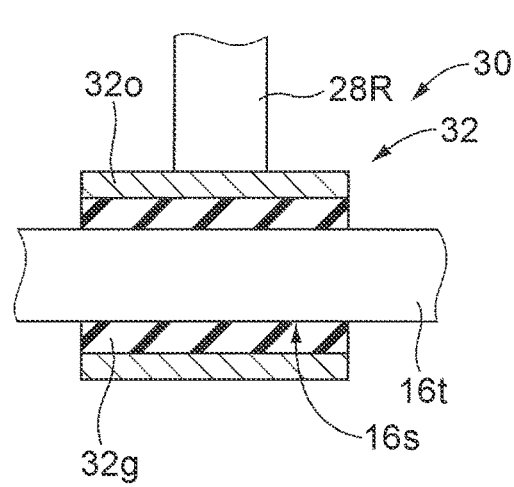
FIG. 2B is a diagram specifically illustrating the structure of a supported portion of the stabilizer bar forming the first stabilizer device.
Figure 2A:
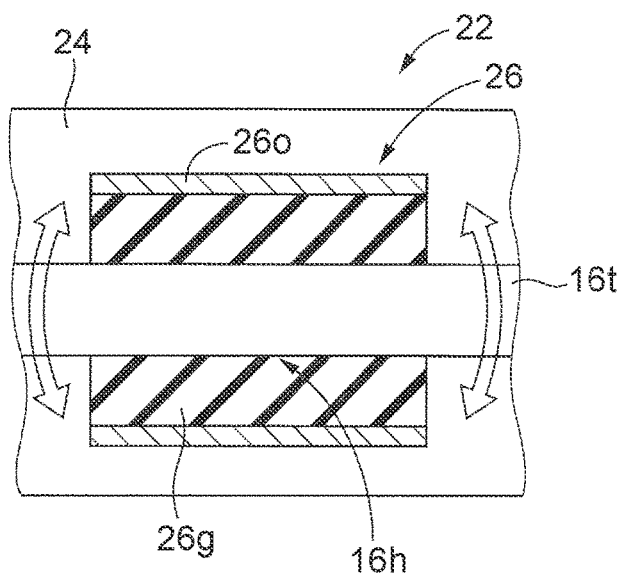
FIG. 2A is a diagram specifically illustrating the structure of a held portion of a stabilizer bar forming the first stabilizer device.

As shown in FIG. 2B, the support 30 includes a bush 32 for the supported portion 16$s$. The bush 32 for the supported portion 16$s$ includes an outer cylinder 32$o$ and a rubber elastic body 32$g$ interposed between the outer cylinder 32$o$ and the torsion bar portion 16$t$ of the stabilizer bar 16. Like the bush 26 for the held portion 16$h$, the bush 32 for the supported portion 16$s$ allows the stabilizer bar 16 to rotate, i.e., twist, about the axis of the torsion bar portion 16$t$.

As can be seen by comparison between FIGS. 2A and 2B, the rubber elastic body 26$g$ of the bush 26 for the held portion 16$h$ is thicker than the rubber elastic body 32$g$ of the bush 32 for the supported portion 16$s$. Since both the rubber elastic body 26$g$ and the rubber elastic body 32$g$ are made of the same material, the bush 26 for the held portion 16$h$ has a lower spring constant in the vertical direction than the bush 32 for the supported portion 16$s$. In other words, the bush 26 for the held portion 16$h$ is less stiff than the bush 32 for the supported portion 16$s$. Therefore, the stabilizer bar 16 is firmly supported at the supported portions 16$s$R, 16$s$L and has relatively low resistance to its own rotation about the held portion 16$h$.

As shown by white arrows in FIG. 1, each of the cylinders 28R, 28L can be extended and retracted by vertical movement of a corresponding one of the right and left supported portions 16$s$R, 16$s$L of the torsion bar portion 16$t$ of the stabilizer bar 16. The housing 28$h$ of each cylinder 28R, 28L is divided by the piston 28$p$ into two liquid chambers whose capacities vary according to extension and retraction of the cylinder 28R, 28L, namely an upper chamber 28$c$U and a lower chamber 28$c$L. Specifically, each cylinder 28R, 28L has the upper chamber 28$c$U and the lower chamber 28$c$L. The upper chamber 28$c$U is a first liquid chamber whose capacity increases when the cylinder 28R, 28L is extended, namely when a corresponding one of the front wheels 10FR, 10FL rebounds, and whose capacity decreases when the cylinder 28R, 28L is retracted, namely when the corresponding front wheel 10FR, 10FL bounds. The lower chamber 28cL is a second liquid chamber whose capacity decreases when the cylinder 28R, 28L is extended and whose capacity increases when the cylinder 28R, 28L is retracted.

The first stabilizer device 12 includes a first communication passage 34 and a second communication passage 36. The first communication passage 34 allows the upper chamber 28cU of the cylinder 28L and the lower chamber 28cL of the cylinder 28R to communicate with each other, and the second communication passage 36 allows the lower chamber 28cL of the cylinder 28L and the upper chamber 28cU of the cylinder 28R to communicate with each other. The first stabilizer device 12 further includes an inter-passage communication passage 38 and an on-off valve 40 disposed in the inter-passage communication passage 38. The inter-passage communication passage 38 allows the first communication passage 34 and the second communication passage 36 to communicate with each other. The on-off valve 40 is a normally closed electromagnetic valve that is opened when energized. The on-off valve 40 is switched between the open state and the closed state to open and close the inter-passage communication passage 38. Specifically, an inter-passage communicating state is attained when the on-off valve 40 is opened. Namely, the first communication passage 34 and the second communication passage 36 communicate with each other when the on-off valve 40 is in the open state. An inter-passage non-communicating state is attained when the on-off valve 40 is closed. Namely, the first communication passage 34 and the second communication passage 36 do not communicate with each other when the on-off valve 40 is in the closed state.

In other words, in the first stabilizer device 12, each of the first communication passage 34 and the second communication passage 36 is a cross pipe, and the first stabilizer device 12 includes two hydraulic systems each comprised of a corresponding one of the cross pipes and the upper chamber 28cU of one cylinder 28 and the lower chamber 28cL of the other cylinder 28 which are connected by the cross pipe. For communication between the two hydraulic systems, the first stabilizer device 12 includes a switching mechanism including the inter-passage communication passage 38 and the on-off valve 40, namely a switching mechanism 42 that selectively attains the inter-passage communicating state and the inter-passage non-communicating state.

Although detailed description will be omitted, the first stabilizer device 12 includes a valve mechanism 44 as a mechanism that allows hydraulic fluid to flow into and out of at least one of the two hydraulic systems, specifically each of the first communication passage 34 and the second communication passage 36. The valve mechanism 44 allows hydraulic fluid to flow into and out of both the first communication passage 34 and the second communication passage 36 in accordance with a volume change of the hydraulic fluid which is caused by a temperature change of the first stabilizer device 12. In order to carry out the function of allowing hydraulic fluid to flow into and out of the first communication passage 34 and the second communication passage 36, the valve mechanism 44 is connected to an accumulator 48 included in the second stabilizer device 14 described later via an inter-device communication passage 46. The valve mechanism 44 has an injection port 50 from which hydraulic fluid is injected into the first stabilizer device 12.

The stabilizer system includes an electronic control unit (hereinafter also referred to as "ECU") 55 that functions as a controller for the first stabilizer device 12, and the ECU 55 controls operation of the on-off valve 40. Although detailed description will be omitted, the ECU 55 includes: a computer including a central processing unit (CPU), a read only memory (ROM), a random access memory (RAM), etc.; and a drive circuit for the on-off valve 40.

(b) Configuration of Second Stabilizer Device

The rear wheels 10RR, 10RL are suspended by a rigid axle suspension system, and the second stabilizer device 14 is provided for the rear wheels 10RR, 10RL. Like the first stabilizer device 12, the second stabilizer device 14 includes a stabilizer bar 60 as a main component. The stabilizer bar 60 of the second stabilizer device 14 includes a middle torsion bar portion 60t and right and left arm portions 60aR, 60aL. The torsion bar portion 60t and the right and left arm portions 60aR, 60aL form a single-piece member. The directions in which the right and left arm portions 60aR, 60aL extend cross the lateral direction of the vehicle, namely the direction in which the torsion bar portion 60t extends.

The torsion bar portion 60t of the stabilizer bar 60 has a pair of right and left supported portions 60sR, 60sL, and the stabilizer bar 60 is supported at the supported portions 60sR, 60sL by an axle housing 62 via supports 64. Both ends of the axle housing 62 function as wheel holding portions that hold the rear wheels 10RR, 10RL. The axle housing 62 can swing as shown by white arrows in FIG. 1 based on vertical movement of the rear wheels 10RR, 10RL relative to the vehicle body. Although not shown in the figure, like the supports 30 of the first stabilizer device 12 described above, each support 64 has a bush for the supported portion 60s which includes an outer cylinder and a rubber elastic body, and the bush allows the stabilizer bar 60 to rotate, i.e., twist, about the axis of the torsion bar portion 60t.

Both ends of the stabilizer bar 60, that is, the tip ends of the right and left arm portions 60aR, 60aL, are connected to parts 24 of the vehicle body, more specifically, to right and left parts of the vehicle body in the lateral direction of the vehicle. Specifically, the tip end of the right arm portion 60aR is connected to the right part of the vehicle body via a link rod 66, and the tip end of the left arm portion 60aL is connected to the left part of the vehicle body via link rods 68, 70 and a cylinder 72. Like the cylinders 28 of the first stabilizer device 12, the cylinder 72 includes a housing 72h, a piston 72p disposed in the housing 72h, and a piston rod 72r. The piston rod 72r has its base end connected to the piston 72p and extends downward so that its tip end (lower end) extends out of the housing 72h. The housing 72h is swingably supported by the part 24 of the vehicle body via a bush. One end of the link rod 68 is connected to the tip end of the arm portion 60aL, the other end of the link rod 68 is connected to one end of the link rod 70, and the other end of the link rod 70 is connected to the housing 72h of the cylinder 72. The tip end of the piston rod 72r is connected to an intermediate portion of the link rod 68. The tip end of the piston rod 72r is thus connected to the tip end of the left arm portion 60aL of the stabilizer bar 60, that is, one end of the stabilizer bar 60.

As shown by a white arrow in FIG. 1, the cylinder 72 can be extended and retracted as the axle housing 62 swings. Like the cylinders 28 of the first stabilizer device 12, the housing 70h is divided by the piston 72p into two liquid chambers whose capacities vary according to extension and retraction of the cylinder 72, namely an upper chamber 72cU and a lower chamber 72cL. Specifically, the cylinder 72 has the upper chamber 72cU and the lower chamber 72cL, the upper chamber 72cU is a first liquid chamber whose capacity increases when the cylinder 72 is extended and whose capacity decreases when the cylinder 72 is retracted, and the lower chamber 72cL is a second liquid chamber whose capacity decreases when the cylinder 72 is extended and whose capacity increases when the cylinder 72 is retracted.

The second stabilizer device 14 includes an inter-chamber communication passage 74 that allows the upper chamber 72$c$U and the lower chamber 72$c$L of the cylinder 72 to communicate with each other. A first on-off valve 76 and a second on-off valve 78 are arranged in series in the inter-chamber communication passage 74. The first on-off valve 76 and the second on-off valve 78 are normally open electromagnetic valves that are closed when energized. The first on-off valve 76 and the second on-off valve 78 are switched between the open state and the closed state to open and close the inter-chamber communication passage 74. Specifically, an inter-chamber communicating state is attained when both the first on-off valve 70 and the second on-off valve 78 are opened. Namely, the upper chamber 72$c$U and the lower chamber 72$c$L communicate with each other when both the first on-off valve 76 and the second on-off valve 78 are in the open state. An inter-chamber non-communicating state is attained when both the first on-off valve 76 and the second on-off valve 78 are closed. Namely, the upper chamber 72$c$U and the lower chamber 72$c$L do not communicate with each other when both the first on-off valve 76 and the second on-off valve 78 are in the closed state. In other words, the second stabilizer device 14 includes a switching mechanism including the first on-off valve 76 and the second on-off valve 78, that is, a switching mechanism 80 that selectively attains the inter-chamber communicating state and the inter-chamber non-communicating state.

As will be described in detail later, the cylinder 72 is a one-side rod cylinder, and the overall capacity of the housing 72$h$, that is, the sum of the capacity of the upper chamber 72$c$U and the capacity of the lower chamber 72$c$L, varies as the cylinder 72 is extended and retracted. In other words, there is a difference between the amount of hydraulic fluid that flows into and out of the upper chamber 72$c$U as the cylinder 72 is extended and retracted and the amount of hydraulic fluid that flows into and out of the lower chamber 72$c$L as the cylinder 72 is extended and retracted. In the second stabilizer device 14, the accumulator 48 described above is connected to the inter-chamber communication passage 74 at a position between the first on-off valve 76 and the second on-off valve 78 in order to compensate for this difference, i.e., the capacity change. The accumulator 48 will be described in more detail. The accumulator 48 functions as both an accumulator required for the first stabilizer device 12 and an accumulator required for the second stabilizer device 14. The accumulator 48 is therefore used by both the first stabilizer device 12 and the second stabilizer device 14. The stabilizer system according to the embodiment thus uses a reduced number of accumulators. In the stabilizer system according to the embodiment, it can be considered that the hydraulic systems of the first stabilizer device 12 and the hydraulic system of the second stabilizer device 14 are coupled by the inter-device communication passage 46 mentioned above.

Hydraulic fluid is also injected into the second stabilizer device 14 from the injection port 50 provided in the first stabilizer device 12 through the inter-device communication passage 46. That is, the injection port 50 can be considered to be a single injection port that is used by both the first stabilizer device 12 and the second stabilizer device 14. In the stabilizer system according to the embodiment, hydraulic fluid can be injected in a simple and easy manner by using the injection port 50. The injection port 50 can also be considered to be a port from which hydraulic fluid is injected into both the accumulator 48 and the valve mechanism 44. The ECU 55 described above further includes drive circuits for the first on-off valve 76 and the second on-off valve 78 and functions also as a controller for the second stabilizer device 14. The ECU 55 controls operation of the first on-off valve 76 and the second on-off valve 78.

In the second stabilizer device 14, the torsion bar portion 60$t$ of the stabilizer bar 60 is supported by the axle housing 62, and the tip ends of the arm portions 60$a$R, 60$a$L are connected to the parts 24 of the vehicle body. Instead of such a stabilizer device, the stabilizer system according to the embodiment may use a stabilizer device having a structure in which a torsion bar portion of a stabilizer bar is supported by the vehicle body and the tip ends of a pair of arm portions are connected to both ends of an axle housing.

[2] Operation of Stabilizer System

Operation of the stabilizer system according to the embodiment will be described below for each of the first stabilizer device 12 and the second stabilizer device 14.

(a) Operation of First Stabilizer Device

Figure 2C:
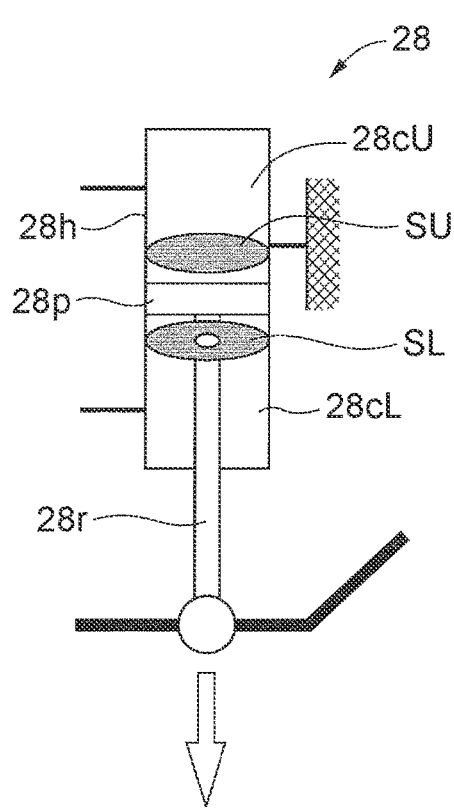
FIG. 2C is a diagram specifically illustrating the structure of a cylinder.

As described above, the inter-passage non-communicating state is attained when the on-off valve 40 of the switching mechanism 42 of the first stabilizer device 12 is closed. Namely, the first communication passage 34 and the second communication passage 36 do not communicate with each other when the on-off valve 40 is in the closed state. As shown in FIG. 2C, the piston rod 28$r$ of the cylinder 28 extends through the lower chamber 28$c$L but does not extend through the tipper chamber 28$c$U. Accordingly, the amount of change in capacity of the upper chamber 28$c$U which occurs as the cylinder 28 is extended and retracted is different front the amount of change in capacity of the lower chamber 28$c$L which occurs as the cylinder 28 is extended and retracted. Accordingly, in the inter-passage non-communicating state, namely when the first communication passage 34 and the second communication passage 36 do not communicate with each other, no hydraulic fluid flows between the upper chamber 28$c$U of the cylinder 28L and the lower chamber 28$c$L of the cylinder 28R through the first communication passage 34, and no hydraulic fluid flows between the upper chamber 28$c$U of the cylinder 28R and the lower chamber 28$c$L of the cylinder 28L through the second communication passage 36. That is, the cylinders 28R, 28L are not allowed to be extended and retracted.

Figure 3A:
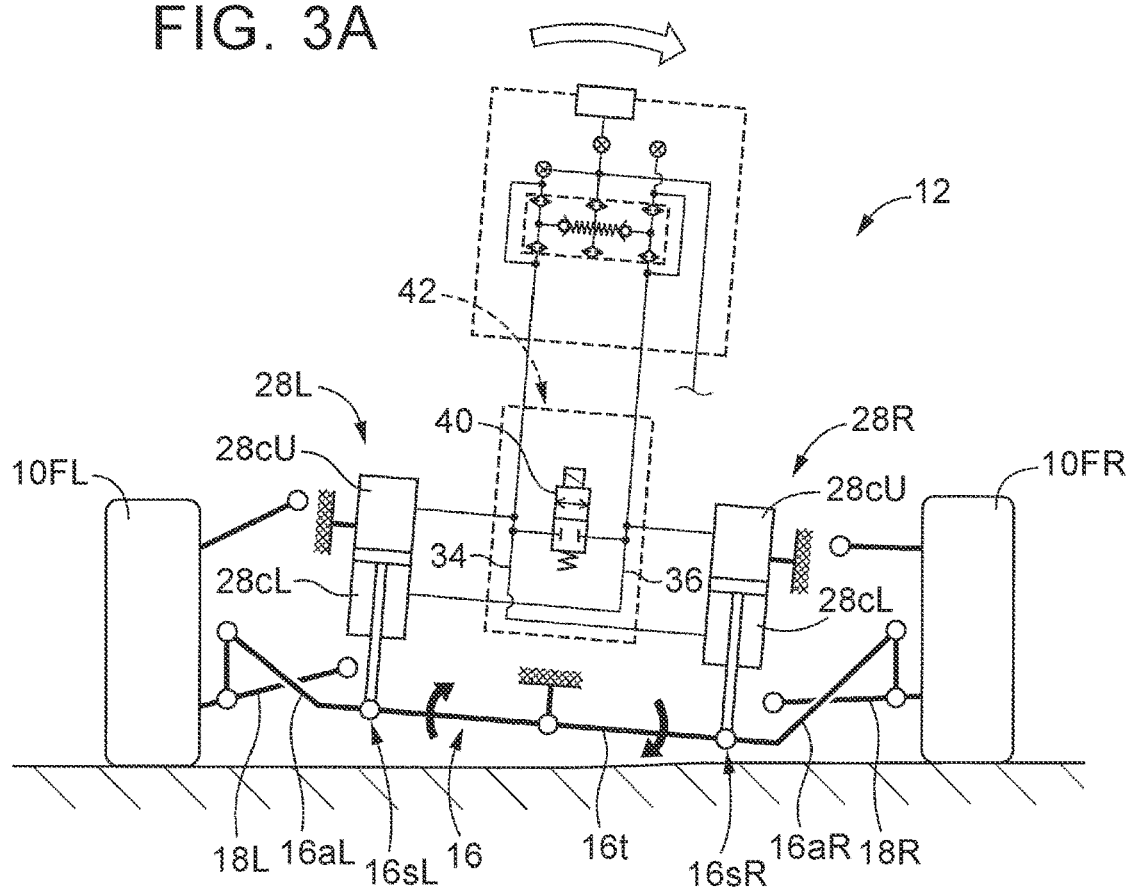
FIG. 3A is a schematic diagram illustrating operation of the first stabilizer device.

As shown in FIG. 3A, when the vehicle turns, the vehicle body is tilted, i.e., rolls, to the right or left. FIG. 3A illustrates the vehicle body tilted to the right when the vehicle turns left. When the cylinders 28R, 28L are not allowed to be extended and retracted, the supported portions 16$s$R, 16$s$L of the torsion bar portion 16$t$ of the stabilizer bar 16 which are supported by the tip ends of the piston rods 28$r$ of the cylinders 28R, 28L are not allowed to move in the vertical direction relative to the vehicle body. The torsion bar portion 16$t$ is therefore twisted. The reaction force to the twisting force acts on the lower arms 18R, 18L via the right and left arm portions 16$a$R, 16$a$L, so that roll of the vehicle body is reduced.

Figure 3B:
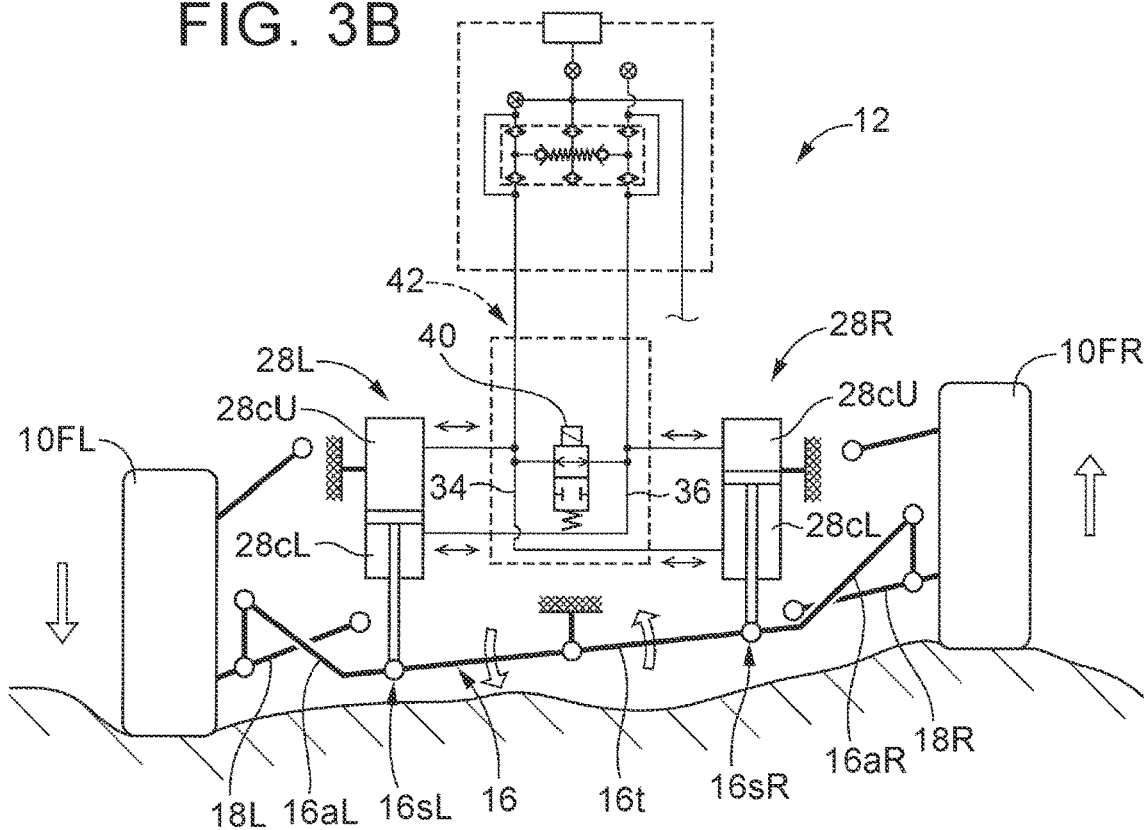
FIG. 3B is a schematic diagram illustrating operation of the first stabilizer device.

As shown in FIG. 3B, the inter-passage communicating state is attained when the on-off valve 40 is opened. That is, the first communication passage 34 and the second communication passage 36 communicate with each other when the on-off valve 40 is in the open state. Hydraulic fluid is therefore allowed to flow substantially freely into and out of the upper chambers 28$c$U and the lower chambers 28$c$L of the cylinders 28R, 28L. Both of the cylinders 28R, 28L are allowed to be extended and retracted with almost no restrictions.

It is herein assumed that external inputs are applied to the right and left front wheels 10FR, 10FL with the cylinders 28R, 28L being allowed to be extended and retracted, as shown in FIG. 3B. FIG. 3B illustrates the case where such external inputs that cause the left front wheel 10FL to rebound and cause the right front wheel 10FR to bound are applied to the right and left front wheels 10FR, 10FL during off-road driving (driving on rough terrain). In this case, the supported portions 16$s$R, 16$s$L of the stabilizer bar 16 are allowed to move in the vertical direction relative to the vehicle body. Accordingly, the stabilizer bar 16 is rotated based on the vertical movement (more exactly, relative vertical movement) of the right and left front wheels 10FR, 10FL. Specifically, when the right and left front wheels 10FR, 10FL bound or rebound, the cylinders 28R, 28L are extended or retracted, and the stabilizer bar 16 is allowed to rotate. Since the supported portions 16$s$R, 16$s$L of the stabilizer bar 16 move in the vertical direction with the stabilizer bar 16 being rotated, the stabilizer bar 16 is hardly twisted. That is, the stabilizer bar 16 does not apply a force to the lower antis 18R, 18L. Accordingly, the stabilizer device 12 can effectively absorb road inputs to the right and left front wheels 10FR, 10FL even during driving on rough terrain.

Each cylinder 28 used in the first stabilizer device 12 is a one-side rod cylinder as shown in FIG. 2C, that is, a cylinder with the piston rod 28$r$ extending out of the housing 28$h$ through one of the two liquid chambers, namely the lower chamber 28$c$L. The pressure receiving area SU of the piston 28$p$ receiving the pressure of hydraulic fluid in the upper chamber 28$c$U is therefore larger than the pressure receiving area SL of the piston 28$p$ receiving the pressure of hydraulic fluid in the lower chamber 28$c$L. Accordingly, when the pressure of hydraulic fluid in the upper chamber 28$c$U is equal to the pressure of hydraulic fluid in the lower chamber 28$c$L, the piston 28$p$ receives a downward force and the cylinder 28 is extended. Such extension of the cylinder 28 is sometimes accompanied by a so-called cavitation phenomenon and is disadvantageous especially in the inter-passage communicating state. In the first stabilizer device 12, the stabilizer bar 16 is held at the held portion 16$h$ by the holder 22, such extension of the cylinder 28 is effectively suppressed.

Figure 2D:
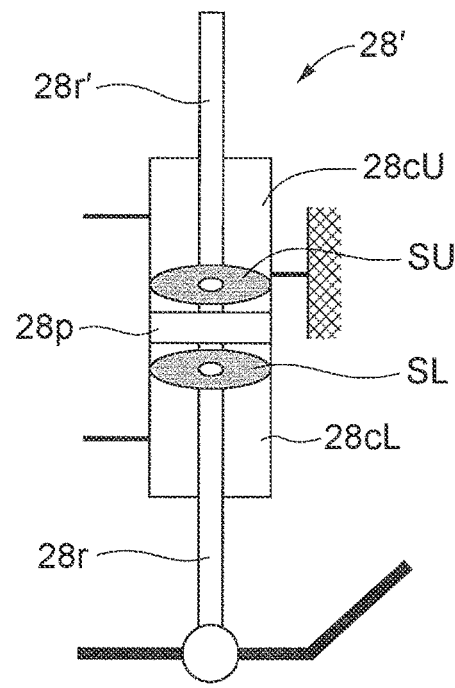
FIG. 2D is a diagram specifically illustrating the structure of a cylinder.

A cylinder 28' as shown in FIG. 2D, that is, a both-side rod cylinder, may be used instead of the cylinder 28. In the cylinder 28', the pressure receiving area SL is equal to the pressure receiving area SU, and the cylinder 28' will not be extended as described above. However, the cylinder 28' requires a complicated structure for sealing of hydraulic fluid etc., and long cylinder installation space is required for the cylinder 28'. Moreover, even when the on-off valve 40 is in the closed state, one of the pair of cylinders 28' is allowed to be extended by a certain amount and the other cylinder 28' is allowed to be extended by the same amount. Accordingly, special consideration is required in order to effectively inhibit extension of both of the cylinders 28'.

(b) Operation of Second Stabilizer Device

As described above, the inter-chamber non-communicating state is attained when both the first on-off valve 76 and the second on-off valve 78 of the switching mechanism 80 of the second stabilizer device 14 are closed. Namely, the upper chamber 72$c$U and the lower chamber 72$c$L of the cylinder 72 do not communicate with each other when both the first on-off valve 76 and the second on-off valve 78 are in the closed state. In this state, hydraulic fluid is not allowed to flow into and out of the upper chamber 72$c$U and the lower chamber 72$c$L, and the cylinder 72 is not allowed to be extended and retracted.

Figure 4A:
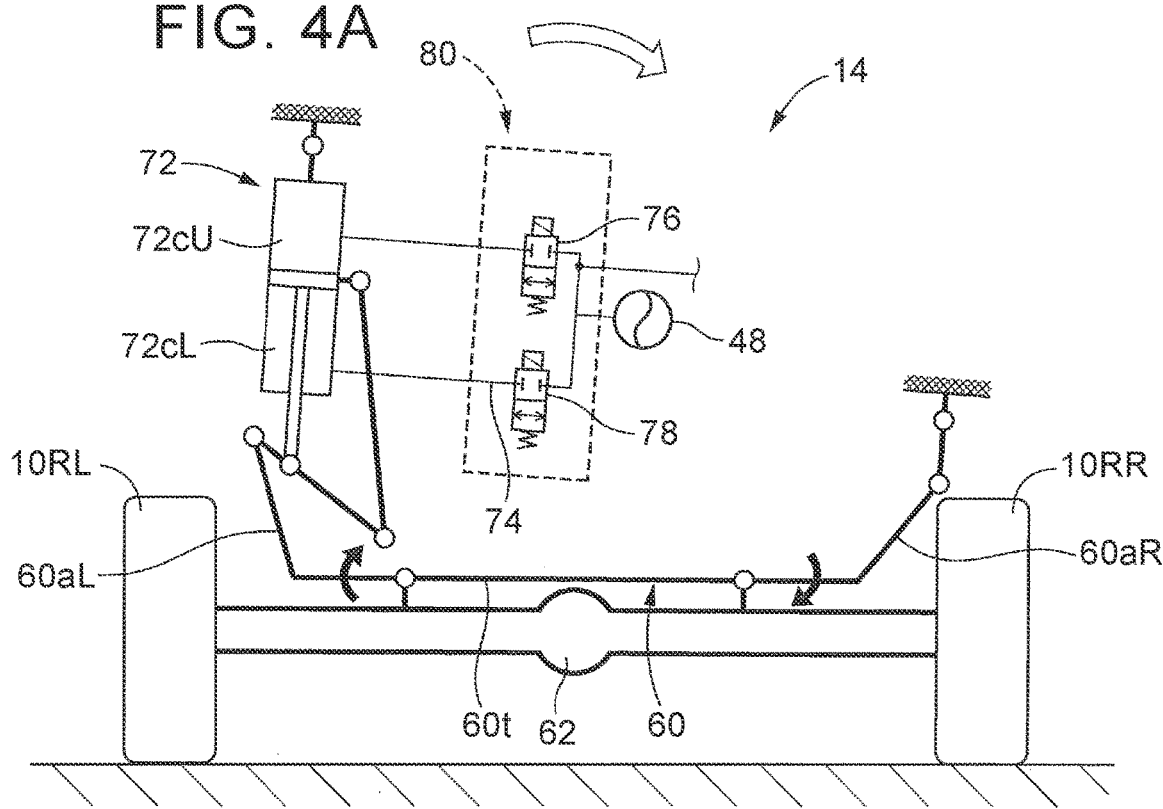
FIG. 4A is a schematic diagram illustrating operation of a second stabilizer device of the stabilizer system of the embodiment which is mounted on rear wheels.

As shown in FIG. 4A, when the vehicle turns, the vehicle body is tilted, i.e., rolls, to the right or left. FIG. 4A illustrates the vehicle body tilted to the right when the vehicle turns left. As the vehicle body is tilted, the axle housing 62 that supports the torsion bar portion 60$t$ of the stabilizer bar 60 at the supported portions 60$s$L, 60$s$R swings relative to the vehicle body. When the cylinder 72 is not allowed to be extended and retracted, the vertical positions of the arm portions 60$a$R, 60$a$L of the stabilizer bar 60 with respect to the vehicle body do not substantially vary. The torsion bar portion 60$t$ of the stabilizer bar 60 is therefore twisted by the swinging of the axle housing 62. The reaction force to the twisting force acts on the parts 24 of the vehicle body through the right and left arm portions 60$a$R, 60$a$L and the cylinder 72, so that roll of the vehicle body is reduced.

Figure 4B:
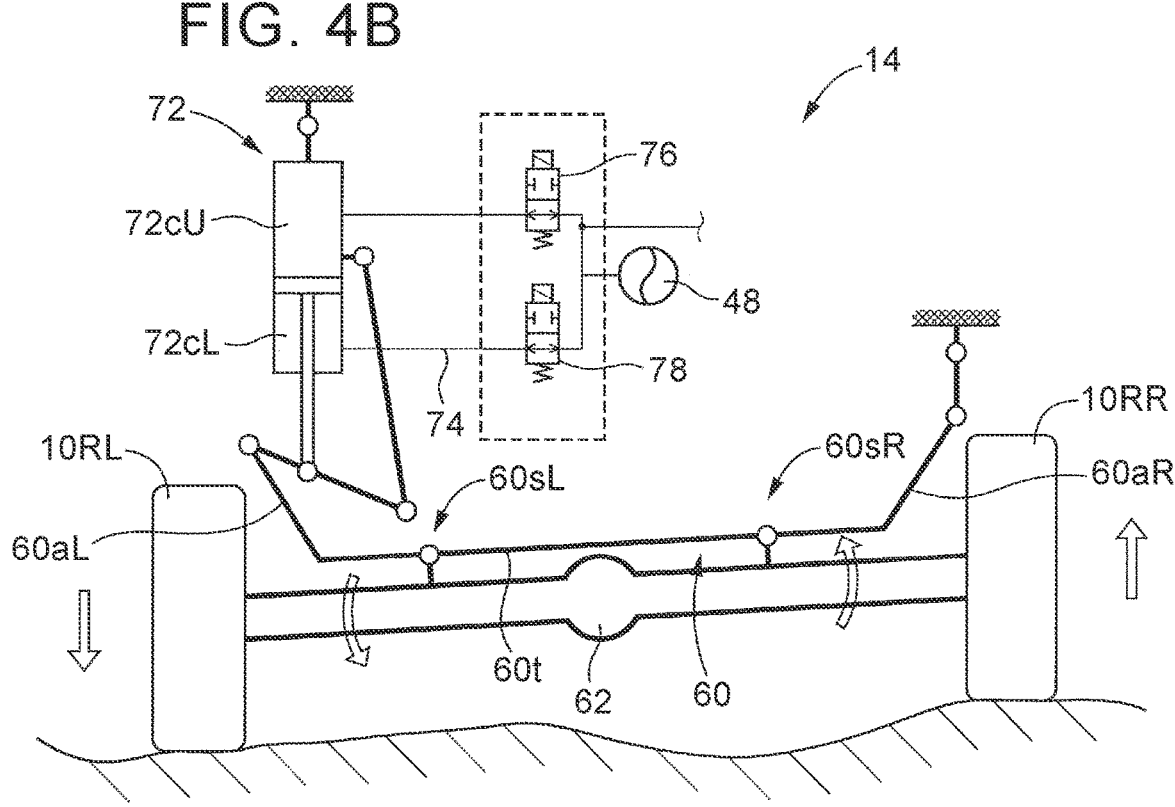
FIG. 4B is a schematic diagram illustrating operation of the second stabilizer device of the stabilizer system of the embodiment which is mounted on the rear wheels.

As shown in FIG. 4B, the inter-chamber communicating state is attained when both the first on-off valve 76 and the second on-off valve 78 are opened. Namely, the upper chamber 72$c$U and the lower chamber 72$c$L of the cylinder 72 communicate with each other when both the first on-off valve 76 and the second on-off valve 78 are in the open state. Hydraulic fluid is therefore allowed to flow substantially freely into and out of the upper chamber 72$c$U and the lower chamber 72$c$L. The cylinder 72 is allowed to be extended and retracted with almost no restrictions.

It is herein assumed that external inputs are applied to the right and left rear wheels 10RR, 10RL with the cylinder 72 being allowed to be extended and retracted, as shown in FIG. 4B. FIG. 4B illustrates the case where such external inputs that cause the left rear wheel 10RL to rebound and cause the right rear wheel 10RR to bound are applied to the right and left rear wheels 10RR, 10RL during off-road driving. In this case, the axle housing 62 swings, and the stabilizer bar 60 that is supported at the supported portions 60$s$R. 60$s$L by the axle housing 62 also swings accordingly. However, since the cylinder 72 is allowed to be extended and retracted, the torsion bar portion 60$t$ of the stabilizer bar 60 is hardly twisted by the swinging of the stabilizer bar 60. That is, the stabilizer bar 60 does not apply a force against the swinging of the axle housing 62 with respect to the vehicle body. Accordingly, the stabilizer device 14 can effectively absorb road inputs to the right and left rear wheels 10RR, 10RL even during driving on rough terrain.

(c) Roll Stiffness by Stabilizer Device

As described above, the first stabilizer device 12 exerts an anti-roll effect when the inter-passage non-communicating state is attained, and the second stabilizer device 14 exerts an anti-roll effect when the inter-chamber non-communicating state is attained. The extent to which roll of the vehicle body is reduced will be described. The first stabilizer device 12 and the second stabilizer device 14 are configured so that roll stiffness on the front wheel 10F side is higher than that on the rear wheel 10R side when both the first stabilizer device 12 and the second stabilizer device 14 exert the anti-roll effect. With this configuration, the vehicle tends to understeer and exhibits a stable turning behavior.

[3] Control of Stabilizer System

The stabilizer system according to the embodiment switches between the inter-passage communicating state and the inter-passage non-communicating state in the first stabilizer device 12 and switches between the inter-chamber communicating state and the inter-chamber non-communicating state in the second stabilizer device 14 in accordance with the running state of the vehicle.

Specifically, it is assumed that there are a situation where the vehicle is driving off-road and a situation where the vehicle is going to drive off-road. In the latter situation, the inter-passage communicating state is attained in the first stabilizer device 12 by energizing and thus opening the on-off valve 40, and the inter-chamber communicating state is attained in the second stabilizer device 14 by energizing neither the first on-off valve 76 nor the second on-off valve 78, namely by opening both the first on-off valve 76 and the second on-off valve 78.

The vehicle equipped with the stabilizer system according to the embodiment is a vehicle suitable for off-road driving, and the mode of a transmission in a drive train is switched between off-road driving and on-road driving based on the driver's selection. Whether the vehicle is in the situation where the vehicle is going to drive off-road is determined based on whether the transmission is in an off-road drive mode. The inter-passage communicating state and the inter-chamber communicating state may be attained in the situation where the vehicle is actually driving off-road. In this case, whether the vehicle is in the situation where the vehicle is actually driving off-road can be determined based on, e.g., the extent of change in sprung acceleration etc., detected by a sprung acceleration sensor etc. mounted on the vehicle body.

In the case where the vehicle is not in the situation where the vehicle is going to drive off-road and the extent of turning of the vehicle (e.g., sharpness of a turn) is greater than a set extent, the inter-passage non-communicating state is attained in the first stabilizer device 12 by not energizing the on-off valve 40, namely be closing the on-off valve 40, and the inter-chamber non-communicating state is attained in the second stabilizer device 14 by energizing and thus opening both the first on-off valve 76 and the second on-off valve 77. In other words, in this case, a necessary condition for the inter-passage non-communicating state and the inter-chamber non-communicating state to be attained is that the vehicle is turning.

Whether the extent of turning of the vehicle is greater than the set extent can be determined based on the amount of operation of a steering operation member (the operation angle of a steering wheel), the operation speed of the steering operation member (the operation speed of the steering wheel), the amount of turning of the wheels, the turning speed of the wheels, the vehicle speed, the lateral acceleration of the vehicle body, the yaw rate of the vehicle, etc. Specifically, in the stabilizer system according to the embodiment, it is determined that the extent of turning of the vehicle is greater than the set extent when one of the following two conditions is satisfied: (a) the lateral acceleration Gy divided by the operation amount (operation angle) θ of the steering operation member is larger than a threshold A; and (b) the rate of change (steering speed) vθ in operation amount θ of the steering operation member is higher than a threshold speed B.

In the event that the stabilizer system has an electrical failure, for example, in the event that the ECU 55, which is a controller, is not functioning, the on-off valve 40, which is a normally closed electromagnetic valve, is in the closed state, and both the first on-off valve 76 and the second on-off valve 78, which are normally open electromagnetic valves, are in the open state. Accordingly, the inter-passage non-communicating state is attained in the first stabilizer device 12 and the inter-chamber communicating state is attained in the second stabilizer device 14, so that the anti-roll effect is exerted on the front wheel 10F side but is not exerted on the rear wheel 10R side. In the event that the stabilizer system according to the embodiment has an electrical failure, roll stiffness is increased only on the front wheel 10F side. The vehicle thus has a relatively strong tendency to understeer when turning and exhibits a fairly stable turning behavior even in case of an electrical failure.

Figure 5:
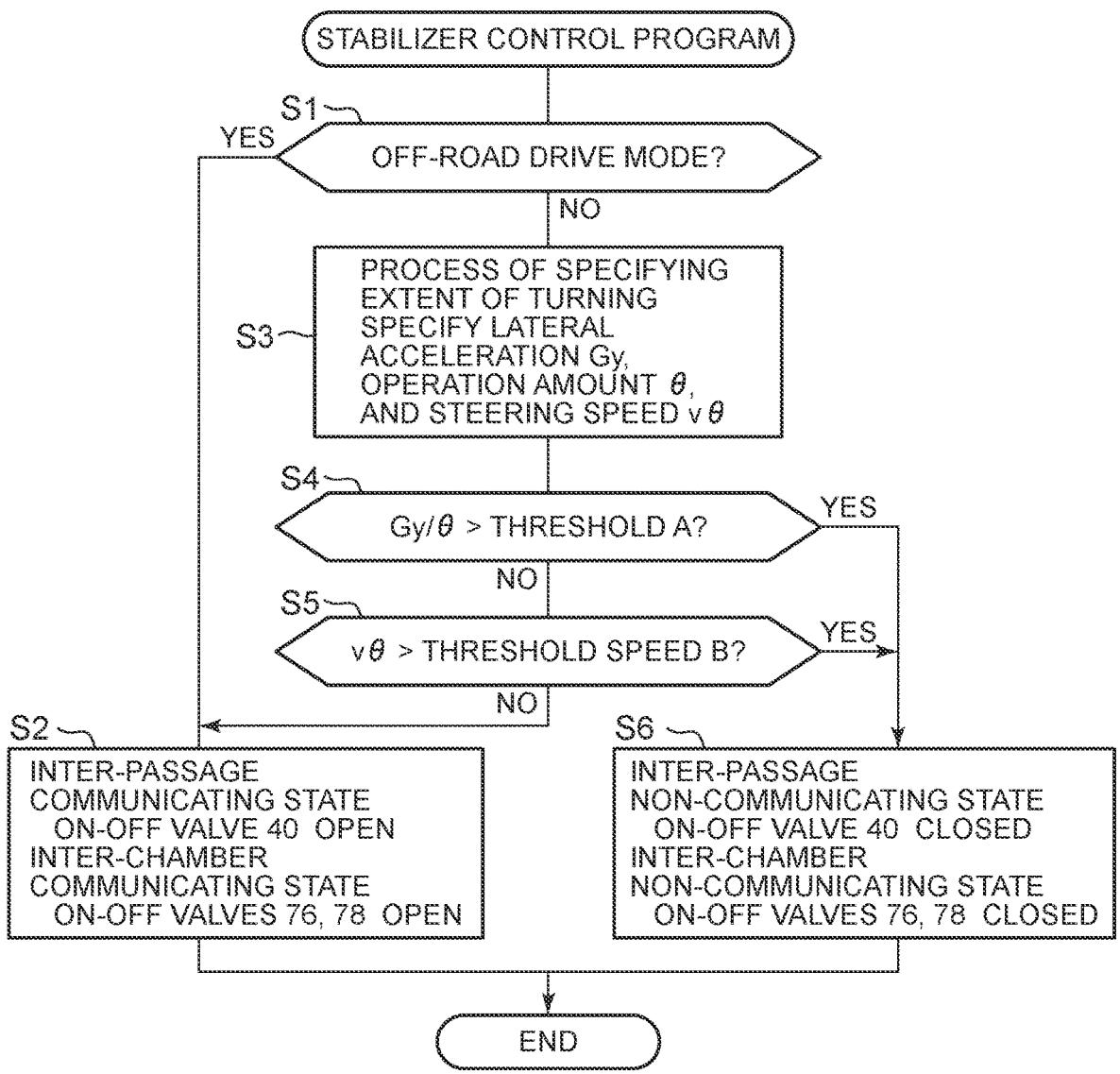
FIG. 5 is a flowchart illustrating a stabilizer control program that is executed by an electronic control unit (ECU), which is a controller of the stabilizer system of the embodiment.

The ECU 55 controls the stabilizer system according to the embodiment by repeatedly executing a stabilizer control program at short time intervals (e.g., at intervals of several to several tens of milliseconds). FIG. 5 is a flowchart of the stabilizer control program. The process of the stabilizer control program will be briefly described below.

In the process of the stabilizer control program, the ECU 55 first determines in S1 whether the transmission is in the off-road drive mode. When the transmission is in the off-road drive mode, the ECU 55 attains the inter-passage communicating state in the first stabilizer device 12 by opening the on-off valve 40 and attains the inter-chamber communicating state in the second stabilizer device 14 by opening the first on-off valve 76 and the second on-off valve 78 in S2.

When the ECU 55 determines in S1 that the transmission is not in the off-road drive mode, the ECU 55 specifies the extent of turning of the vehicle in S3. Specifically, the ECU 55 specifies the lateral acceleration Gy, the amount θ of operation of the steering operation member, and the steering speed vθ. The ECU 55 then determines in S4 whether the lateral acceleration Gy divided by the amount θ of operation of the steering operation member is larger than the threshold A and determines in S5 whether the steering speed vθ is higher than the threshold speed B. When at least one of the condition that the lateral acceleration Gy divided by the amount θ of operation of the steering operation member is larger than the threshold A and the condition that the steering speed vθ is higher than the threshold speed B, the ECU 55 attains the inter-passage non-communicating state in the first stabilizer device 12 by closing the on-off valve 40 and attains the inter-chamber non-communicating state in the second stabilizer device 14 by closing the first on-off valve 76 and the second on-off valve 78 in S6. When none of the conditions in S4 and S5 are satisfied, the ECU 55 attains the inter-passage communicating state in the first stabilizer device 12 by opening the on-off valve 40 and attains the inter-chamber communicating state in the second stabilizer device 14 by opening the first on-off valve 76 and the second on-off valve 78 in S2.

As described above, the ECU 55 executes the process of the stabilizer control program to control the stabilizer system either to exert the anti-roll effect or not to exert the anti-roll effect, depending on the driving state of the vehicle.

When the first stabilizer device 12 according to the embodiment is in the inter-passage non-communicating state in order to exert the anti-roll effect, there is sometimes a fairly large difference in pressure of hydraulic fluid between the first hydraulic system in which the upper chamber 28cU of the cylinder 28L and the lower chamber 28cL of the cylinder 28R communicate with each other through the first communication passage 34 and the second hydraulic system in which the lower chamber 28cL of the cylinder 28L and the upper chamber 28cU of the cylinder 28R communicate with each other through the second communication passage 36. When the first stabilizer device 12 having a large pressure difference between the first and second hydraulic systems is switched from the inter-passage non-communicating state to the inter-passage communicating state, hydraulic fluid rushes from the hydraulic system with a higher pressure into the hydraulic system with a lower pressure. This sudden and quick flow of hydraulic fluid impacts on the first stabilizer device 12 to some extent, which may cause abnormal noise, vibrations, etc.

Two stabilizer devices, which are modifications of the first stabilizer device 12, will be described below. In these stabilizer devices, the switching mechanism that switches the stabilizer device between the inter-passage communicating state and the inter-passage non-communicating state includes a flow rate limiting mechanism in order to reduce the possibility of hydraulic fluid rushing from one hydraulic system into the other. The flow rate limiting mechanism is a mechanism for limiting the flow rate of hydraulic fluid that is allowed to flow between the first communication passage 34 and the second communication passage 36 when the stabilizer device is switched from the inter-passage non-communicating state to the inter-passage communicating state.

(a) Configuration and Operation of Stabilizer Device of First Modification

Figure 6A:
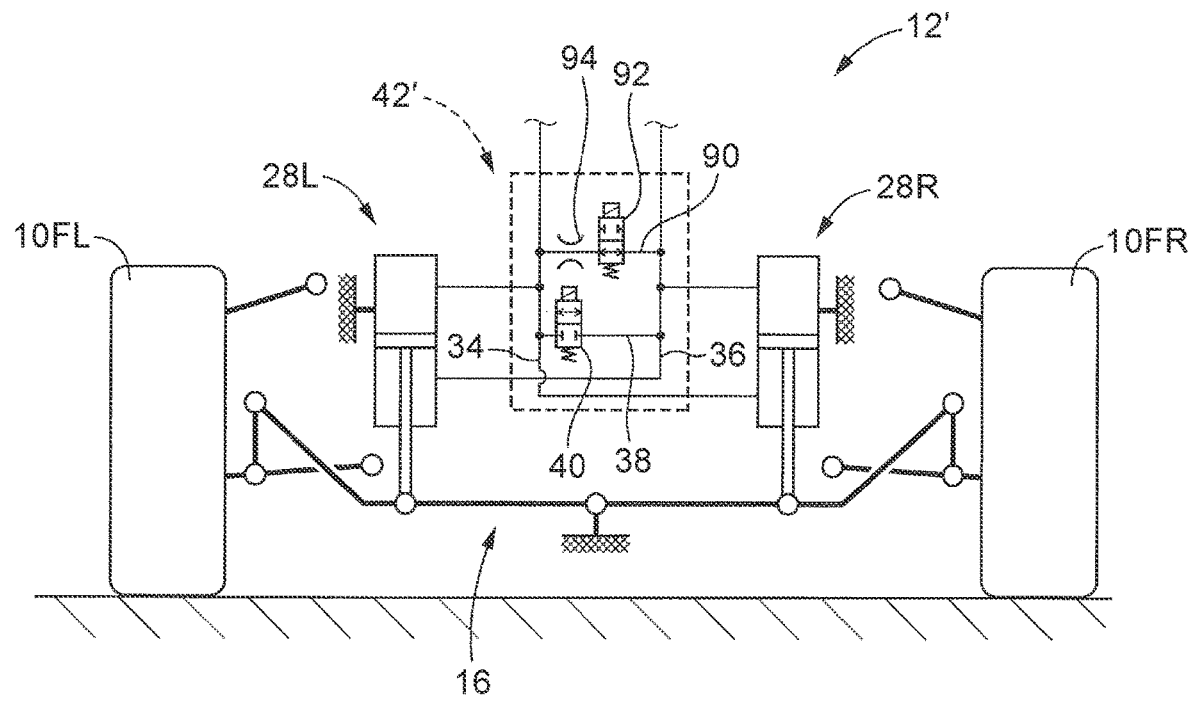
FIG. 6A is a schematic diagram illustrating a modification of the stabilizer device of the embodiment.

A stabilizer device 12' schematically illustrated in FIG. 6A includes a switching mechanism 42' having a different configuration from that of the switching mechanism 42. The switching mechanism 42' includes, in addition to the inter-passage communication passage 38 having the on-off valve 40 disposed therein, a second inter-passage communication passage 90, a second on-off valve 92 disposed in the second inter-passage communication passage 90, and an orifice 94 disposed in series with the second on-off valve 92 in the second inter-passage communication passage 90. The second inter-passage communication passage 90 allows the first communication passage 34 and the second communication passage 36 to communicate with each other. In the stabilizer device 12', the on-off valve 40 is referred to as the first on-off valve 40, and the inter-passage communication passage 38 is referred to as the first inter-passage communication passage 38.

The ECU 55, not shown, also controls operation of the second on-off valve 92. When switching the stabilizer device 12' from the inter-passage communicating state to the inter-passage non-communicating state, the ECU 55 simultaneously switches the first on-off valve 40 and the second on-off valve 92 from the open stale to the closed state. When switching the stabilizer device 12' from the inter-passage non-communicating state to the inter-passage communicating state, the ECU 55 first switches the second on-off valve 92 from the closed state to the open state, and then, after a set time Δt, switches the first on-off valve 40 from the closed state to the opened state.

When switching the stabilizer device 12' to the inter-passage communicating state, hydraulic fluid flows from one of the first communication passage 34 and the second communication passage 36 into the other through the orifice 94 during the set time Δt. Hydraulic fluid therefore do not rush from one of the first communication passage 34 and the second communication passage 36 into the other. That is, a restricted inter-passage communicating state is attained. The set time Δt is set to the time it takes until there is no difference in pressure of hydraulic fluid between the two hydraulic systems, specifically, the shortest time necessary until there is no pressure difference between the two hydraulic systems.

In the switching mechanism 42', the first on-off valve 40 is a normally closed electromagnetic valve, and the second on-off valve 92 is a normally open electromagnetic valve. With this configuration, even in the event that the stabilizer device 12' has, e.g., an electrical failure, hydraulic fluid flows between the first communication passage 34 and the second communication passage 36 with the flow rate being limited by the orifice 94. Roll of the vehicle body is thus reduced to some extent.

(b) Configuration and Operation of Stabilizer Device of Second Modification

Figure 6B:
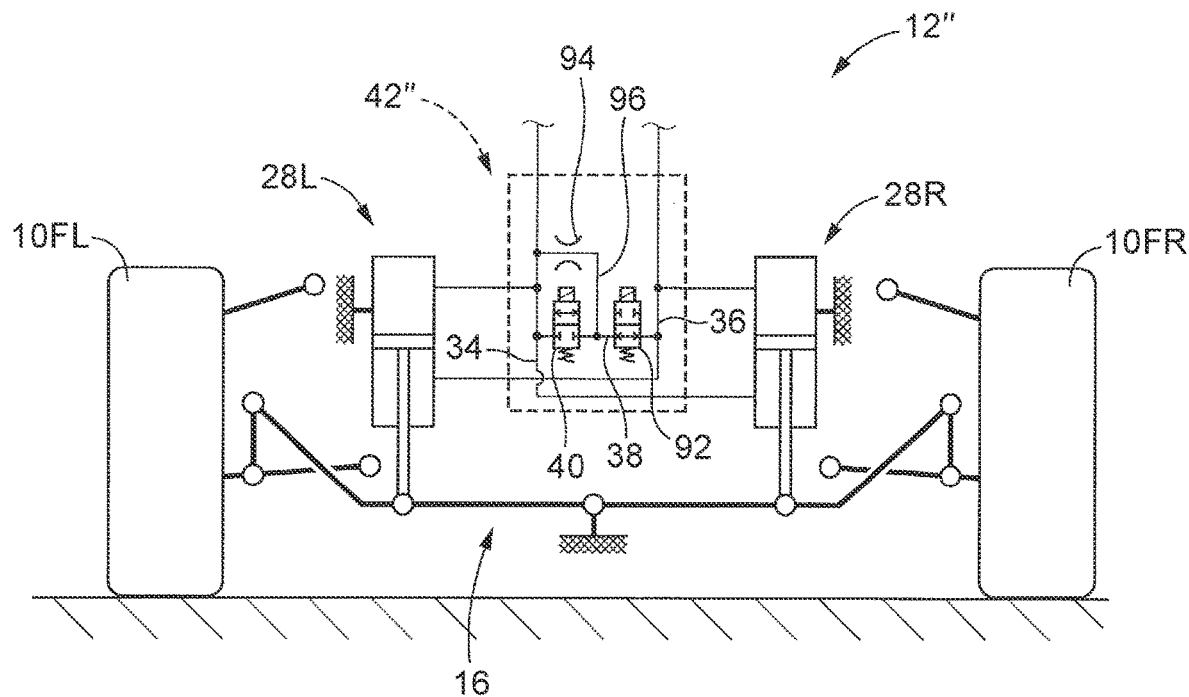
FIG. 6B is a schematic diagram illustrating another modification of the stabilizer device of the embodiment.

A stabilizer device 12" schematically illustrated in FIG. 6B also includes a switching mechanism 42" having a different configuration from that of the switching mechanism 42. The switching mechanism 42" includes a second on-off valve 92 in addition to the on-off valve 40 and further includes a branch passage 96 and an orifice 94 disposed in the branch passage 96. In the stabilizer device 12", the on-off valve 40 is referred to as the first on-off valve 40. The second on-off valve 92 is disposed in series with the first on-off valve 40 in the inter-passage communication passage 38 such that the second on-off valve 92 is located on one side of the first on-off valve 40, namely between the first on-off valve 40 and one of the first communication passage 34 and the second communication passage 36. The branch passage 96 connects to the inter-passage communication passage 38 at a position between the first on-off valve 40 and the second on-off valve 92 and connects the inter-passage communication passage 38 and the other of the first communication passage 34 and the second communication passage 36.

As in the stabilizer device 12' of the first modification, the ECU 55, not shown, also controls operation of the second on-off valve 92. As in the stabilizer device 12' of the first modification, when switching the stabilizer device 12" from the inter-passage communicating state to the inter-passage non-communicating state, the ECU 55 simultaneously switches the first on-off valve 40 and the second on-off valve 92 from the open state to the closed state. When switching the stabilizer device 12" from the inter-passage non-communicating state to the inter-passage communicating state, the ECU 55 first switches the second on-off valve 92 from the closed state to the open state, and then, after the set time Δt, switches the first on-off valve 40 from the closed state to the opened state.

As in the stabilizer device 12' of the first modification, when switching the stabilizer device 12" to the inter-passage communicating state, hydraulic fluid flows from one of the first communication passage 34 and the second communication passage 36 into the other through the orifice 94 during the set time Δt. Hydraulic fluid therefore do not rush from one of the first communication passage 34 and the second communication passage 36 into the other. As in the stabilizer device 12' of the first modification, the first on-off valve 40 is a normally closed electromagnetic valve, and the second on-off valve 92 is a normally open electromagnetic valve. With this configuration, even in the event that the stabilizer device 12" has an electrical failure, roll of the vehicle body is reduced to some extent.

(c) Control Flow

Figure 7:
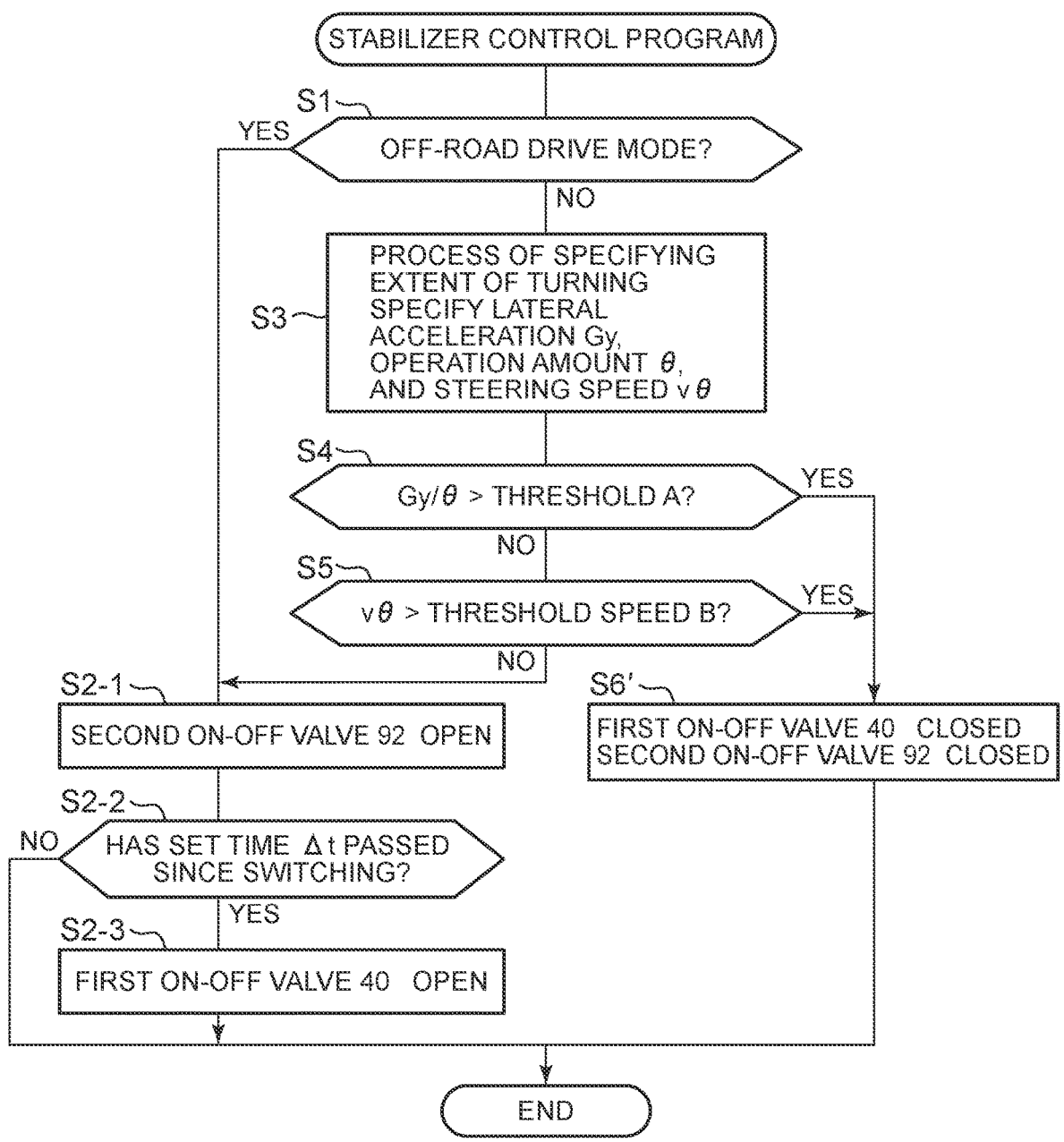
FIG. 7 is a flowchart illustrating a stabilizer control program that is executed for the stabilizer devices of the modifications.

The ECU 55 controls the stabilizer device 12' of the first modification and the stabilizer device 12" of the second modification by executing a stabilizer control program. FIG. 7 is a flowchart of the stabilizer control program. The process of the stabilizer control program will be described below, the process of the stabilizer control program illustrated in the flowchart of FIG. 7 is different from the process of the stabilizer control program illustrated in the flowchart of FIG. 5 only in that S2 in FIG. 5 are replaced with S2-1 to S2-3 and S6 in FIG. 5 is replaced with S6'. Accordingly, only S2-1 to S2-3 and S6' will be described below.

When the transmission is in the off-road drive mode and when the transmission is not in the off-road drive mode but none of the above two conditions regarding the extent of turning of the vehicle are satisfied, the ECU 55 switches the second on-off valve 92 to the open state and keeps the first on-off valve 40 in the state at that time in S2-1. In the initial stage of the switching of the second on-off valve 92 to the open state, that is, when the ECU 55 initially performs S2-1 in the case where the ECU 55 repeatedly and successively perform S2-1, the ECU 55 keeps the first on-off valve 40 in the closed state. The ECU 55 then determines whether a set time Δt has passed since the switching of the second on-off valve 92 to the open state in S2-2. When the ECU 55 determines that the set time Δt has passed, the ECU 55 opens the first on-off valve 40 as well in S2-3. When the ECU 55 determines that the set time Δt has not passed, the ECU 55 skips S2-3.

When the transmission is not in the off-road drive mode and one of the above two conditions regarding the extent of timing of the vehicle is satisfied, the ECU 55 simultaneously closes both the first on-off valve 40 and the second on-off valve 92 in S6' and thus attains the inter-passage non-communicating state. The anti-roll effect is thus exerted.

The number of inter-passage communication passages and the number of on-off valves are not particularly limited. For simplicity of the structure, however, it is desirable that the stabilizer device have a single inter-passage communication passage and a single on-off valve disposed in the inter-passage communication passage.

According to embodiments, for example, the stabilizer device can effectively absorb road inputs during, e.g., off-road driving. With this function, the stabilizer device of the embodiment is highly practical, and the stabilizer system of the disclosure using this stabilizer device is also highly practical.

As used herein, the term "flow rate" refers to the amount of hydraulic fluid that flows per unit time and can also be considered to be "flow velocity." When the stabilizer device is in the inter-passage communicating state, there is almost no pressure difference between the two hydraulic systems. It is therefore considered that hydraulic fluid does not rush from one hydraulic system into the other when the stabilizer device is switched from the inter-passage communicating state to the inter-passage non-communicating state.

The second stabilizer device may be of the same type as, or a different type from, the first stabilizer device.

What is claimed is:

1. A stabilizer device, comprising:
   a stabilizer bar having both ends connected to a pair of wheel holding portions each of which holds a corresponding one of right and left wheels and moves with the corresponding wheel in a vertical direction relative to a vehicle body;
   a holder with which the stabilizer bar is held at a held portion by the vehicle body while allowing the stabilizer bar to rotate as one of the right and left wheels bounds and the other wheel rebounds, the held portion being located in a middle part of the stabilizer bar in a vehicle-width direction of a vehicle;
   a pair of cylinders each containing hydraulic fluid and disposed between the vehicle body and a corresponding one of a pair of right and left supported portions of the stabilizer bar such that the pair of supported portions are supported by the vehicle body, each of the cylinders being configured to be extended and retracted as a corresponding one of the right and left wheels rebounds and bounds with respect to the vehicle body, and each of the cylinders including a first liquid chamber having a capacity that increases when a corresponding one of the right and left wheels rebounds and that decreases when the corresponding wheel bounds and a second liquid chamber having a capacity that decreases when the corresponding wheel rebounds and that increases when the corresponding wheel bounds;
   a first communication passage that allows the first liquid chamber of a first cylinder of the pair of cylinders and the second liquid chamber of a second cylinder of the pair of cylinders to communicate with each other;
   a second communication passage that allows the second liquid chamber of the first cylinder and the first liquid chamber of the second cylinder to communicate with each other;
   an inter-passage communication passage that allows the first communication passage and the second communication passage to communicate with each other;
   an on-off valve disposed in the inter-passage communication passage and switched between an open state and a closed state to open and close the inter-passage communication passage; and
   a controller configured to control operation of the on-off valve to selectively attain an inter-passage communicating state in which the first communication passage and the second communication passage communicate with each other and an inter-passage non-communicating state in which the first communication passage and the second communication passage do not communicate with each other.

2. The stabilizer device according to claim 1, wherein each of the pair of cylinders includes
   a housing connected to one of the vehicle body and a corresponding one of the pair of supported portions of the stabilizer bar,
   a piston disposed in the housing and defining the first liquid chamber and the second liquid chamber, and
   a piston rod having a base end connected to the piston, the piston rod extending through one of the first liquid chamber and the second liquid chamber such that a tip end of the piston rod extends out of the housing, and the piston rod being connected to the other of the vehicle body and the corresponding one of the pair of supported portions of the stabilizer bar.

3. The stabilizer device according to claim 1, wherein the holder includes a bush for the held portion and allows the stabilizer bar to rotate using elasticity of the bush for the held portion.

4. The stabilizer device according to claim 3, wherein a pair of elastic bushes for the supported portions are provided such that each of the pair of elastic bushes is interposed between a corresponding one of the pair of cylinders and a corresponding one of the pair of supported portions of the stabilizer bar, and the bush for the held portion has a smaller spring constant in the vertical direction than each of the bushes for the supported portions.

5. The stabilizer device according to claim 1, wherein the controller is configured to attain the inter-passage communicating state in a situation where a vehicle equipped with the stabilizer device is driving off-road or a situation where the vehicle equipped with the stabilizer device is going to drive off-road.

6. The stabilizer device according to claim 1, wherein a necessary condition for the controller to attain the inter-passage non-communicating state is that the vehicle equipped with the stabilizer device is turning.

7. The stabilizer device according to claim 1, wherein the on-off valve is a normally closed electromagnetic valve that is opened when energized.

8. The stabilizer device according to claim 1, wherein the stabilizer device includes a flow rate limiting mechanism limiting a flow rate of the hydraulic fluid that is allowed to flow between the first communication passage and the second communication passage when the stabilizer device is switched from the inter-passage non-communicating state to the inter-passage communicating state.

9. The stabilizer device according to claim 8, wherein:
when the inter-passage communication passage is a first inter-passage communication passage, and the on-off valve is a first on-off valve,
the stabilizer device includes, as components of the flow rate limiting mechanism,
 a second inter-passage communication passage that allows the first communication passage and the second communication passage to communicate with each other, in addition to the first inter-passage communication passage,
 a second on-off valve that is disposed in the second inter-passage communication passage and is switched between an open state and a closed state to open and close the second inter-passage communication passage, and
 an orifice that is disposed in series with the second on-off valve in the second inter-passage communication passage and restricts flow of the hydraulic fluid passing through the second inter-passage communication passage; and
the controller is configured to control operation of the second on-off valve and to first switch the second on-off valve from the closed state to the open state, and then, after a set time, switch the first on-off valve from the closed state to the open state when switching the stabilizer device from the inter-passage non-communicating state to the inter-passage communicating state so as to allow the flow rate limiting mechanism to function.

10. The stabilizer device according to claim 9, wherein the first on-off valve is a normally closed electromagnetic valve that is opened when energized, and the second on-off valve is a normally open electromagnetic valve that is closed when energized.

11. The stabilizer device according to claim 8, wherein:
when the on-off valve is a first on-off valve,
the stabilizer device includes, as the flow rate limiting mechanism,
 a second on-off valve disposed in series with the first on-off valve in the inter-passage communication passage such that the second on-off valve is located between the first on-off valve and one of the first communication passage and the second communication passage,
 a branch passage connecting to the inter-passage communication passage at a position between the first on-off valve and the second on-off valve and connecting the inter-passage communication passage and the other of the first communication passage and the second communication passage, and
 an orifice that is disposed in the branch passage and restricts flow of the hydraulic fluid passing through the branch passage; and
the controller is configured to control operation of the second on-off valve and to first switch the second on-off valve from a closed state to an open state, and then, after a set time, switch the first on-off valve from the closed state to the open state when switching the stabilizer device from the inter-passage non-communicating state to the inter-passage communicating state so as to allow the flow rate limiting mechanism to function.

12. A stabilizer system, comprising:
the stabilizer device according to claim 1 provided for either right and left front wheels or right and left rear wheels, the stabilizer device being a first stabilizer device; and
a second stabilizer device different from the first stabilizer device and provided for the other of the right and left front wheels and the right and left rear wheels.

13. The stabilizer system according to claim 12, wherein the second stabilizer device includes:
 a stabilizer bar having both ends connected to one of the vehicle body and a pair of wheel holding portions each of which holds a corresponding one of right and left wheels and moves with the corresponding wheel in a vertical direction relative to the vehicle body, and the stabilizer bar being supported by the other of the vehicle body and the pair of wheel holding portions;
 a cylinder disposed between the one of the vehicle body and the pair of wheel holding portions and one of the both ends of the stabilizer bar and configured to be extended and retracted as one of the right and left wheels rebounds and the other wheel bounds and as the one of the right and left wheels bounds and the other wheel rebounds, the cylinder including a first liquid chamber having a capacity that increases when the cylinder is extended and that decreases when the cylinder is retracted and a second liquid chamber having a capacity that decreases when the cylinder is extended and that increases when the cylinder is retracted;
 an inter-chamber communication passage that allows the first liquid chamber and the second liquid chamber to communicate with each other; and
 one or more on-off valves that are disposed in the inter-chamber communication passage and are switched between an open state and a closed state to open and close the inter-chamber communication passage, wherein
the controller is configured to control operation of the one or more on-off valves to selectively attain an inter-chamber communicating state in which the first liquid chamber and the second liquid chamber communicate with each other and an inter-chamber non-communicating state in which the first liquid chamber and the second liquid chamber do not communicate with each other.

14. The stabilizer system according to claim 13, wherein the stabilizer system is configured such that roll stiffness on a front wheel side becomes higher than roll stiffness on a rear wheel side when the inter-passage non-communicating state is attained in the first stabilizer device and the inter-chamber non-communicating state is attained in the second stabilizer device.

15. The stabilizer system according to claim 13, wherein:
the cylinder of the second stabilizer device includes
 a housing connected to either the one of the vehicle body and the pair of wheel holding portions or the one of the both ends of the stabilizer bar,
 a piston disposed in the housing and defining the first liquid chamber and the second liquid chamber, and
 a piston rod having a base end connected to the piston, the piston rod extending through one of the first liquid chamber and the second liquid chamber such that a tip end of the piston rod extends out of the housing, and the piston rod being connected to the other of the one of the vehicle body and the pair of wheel holding portions and the one of the both ends of the stabilizer bar;

the second stabilizer device includes
- a first on-off valve and a second on-off valve which are the one or more on-off valves and are arranged in series in the inter-chamber communication passage, and
- an accumulator that is connected to the inter-chamber communication passage at a position between the first on-off valve and the second on-off valve and that stores the hydraulic fluid; and the controller is configured to attain the inter-chamber communicating state by opening both the first on-off valve and the second on-off valve and to attain the inter-chamber non-communicating state by closing both the first on-off valve and the second on-off valve.

16. The stabilizer system according to claim 15, wherein at least one of the first communication passage and the second communication passage of the first stabilizer device is connected to the accumulator of the second stabilizer device via a valve mechanism.

17. The stabilizer system according to claim 16, wherein the valve mechanism is a mechanism that allows the hydraulic fluid to flow into and out of the at least one of the first communication passage and the second communication passage in accordance with a volume change of the hydraulic fluid which is caused by a temperature change of the first stabilizer device.

18. The stabilizer system according to claim 16, further comprising a single injection port that is used by both the first stabilizer device and the second stabilizer device such that the hydraulic fluid is injected into both the accumulator and the valve mechanism.

19. The stabilizer system according to claim 12, wherein:
- the first stabilizer device is provided for the right and left front wheels; and
- the second stabilizer device is provided for the right and left rear wheels that are suspended by a rigid axle suspension system.

20. The stabilizer system according to claim 19, wherein the second stabilizer device is configured such that the stabilizer bar is supported by an axle housing, both ends of the axle housing serving as the pair of wheel holding portions, and the both ends of the stabilizer bar are connected to right and left parts of the vehicle body.

21. The stabilizer device according to claim 1, wherein the stabilizer bar rotates about an axis of the stabilizer bar.

* * * * *